(12) United States Patent
Giuffrida et al.

(10) Patent No.: US 8,477,190 B2
(45) Date of Patent: Jul. 2, 2013

(54) REAL-TIME MOVING PLATFORM MANAGEMENT SYSTEM

(75) Inventors: Frank D Giuffrida, Honeoye Falls, NY (US); Mark A. Winkelbauer, Rochester, NY (US); Charles Mondello, Pittsford, NY (US); Robert S. Bradacs, Rochester, NY (US); Craig D. Woodward, Rochester, NY (US); Stephen L. Schultz, West Henrietta, NY (US); Scott D. Lawrence, Pittsford, NY (US); Matt Kusak, Rochester, NY (US); Kevin G. Willard, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 427 days.

(21) Appl. No.: 12/831,971

(22) Filed: Jul. 7, 2010

(65) Prior Publication Data

US 2012/0007982 A1    Jan. 12, 2012

(51) Int. Cl.
| | | |
|---|---|---|
| H04N 7/18 | (2006.01) | |
| H04N 3/28 | (2006.01) | |
| H04N 7/00 | (2006.01) | |
| H04B 7/208 | (2006.01) | |
| H04L 12/66 | (2006.01) | |
| H04L 12/56 | (2006.01) | |
| H04J 3/08 | (2006.01) | |
| H04W 4/00 | (2009.01) | |

(52) U.S. Cl.
USPC ........... 348/144; 348/116; 348/143; 348/159; 348/206; 455/427; 455/429; 455/430; 455/431; 370/337; 370/344; 370/352; 370/428; 370/503

(58) Field of Classification Search
USPC .......... 348/116, 143, 144, 159, 206; 370/337, 370/344, 352, 428, 503; 455/427, 429–431
See application file for complete search history.

(56) References Cited

U.S. PATENT DOCUMENTS

| | | |
|---|---|---|
| 2,273,876 A | 2/1942 | Lutz et al. |
| 3,153,784 A | 10/1964 | Petrides et al. |

(Continued)

FOREIGN PATENT DOCUMENTS

| | | |
|---|---|---|
| AT | 331204 T | 7/2006 |
| AU | 9783798 | 4/1999 |

(Continued)

OTHER PUBLICATIONS

Ackermann, Prospects of Kinematic GPS Aerial Triangulation, ITC Journal, 1992.

(Continued)

*Primary Examiner* — David Lazaro
*Assistant Examiner* — Farzana Huq
(74) *Attorney, Agent, or Firm* — Dunlap Codding, P.C.

(57) ABSTRACT

A moving platform system suitable for mounting and use on a moving platform, comprising a position system monitoring the location of the moving platform and generating a sequence of time-based position data, a non-line of sight communication system, a high-speed line of sight communication system, and a computer system monitoring the availability of the non-line of sight communication system and the high-speed line of sight communication system and initiating connections when the non-line of sight communication system and the high-speed line of sight communication system are available, and receiving the sequence of time-based position data and transmitting the sequence of time-based position data via the at least one of the currently available non-line of sight communication system and the high-speed line of sight communication system.

2 Claims, 19 Drawing Sheets

U.S. PATENT DOCUMENTS

| | | | |
|---|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,542,077 B2 | 4/2003 | Joao |
| 6,549,651 B2 | 4/2003 | Xiong et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,142,984 B2 | 11/2006 | Rahmes et al. |
| 7,233,691 B2 | 6/2007 | Setterholm |
| 7,262,790 B2 | 8/2007 | Bakewell |
| 7,348,895 B2 | 3/2008 | Lagassey |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |

FOREIGN PATENT DOCUMENTS

| | | |
|---|---|---|
| AU | 3874400 | 9/2000 |
| AU | 03/291364 | 6/2004 |
| BR | 0316110 | 9/2005 |
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1180967 | 2/2002 |
| EP | 1418402 | 5/2004 |
| EP | 1696204 | 8/2006 |
| ES | 2266704 T | 3/2007 |

| | | |
|---|---|---|
| HK | 1088421 A | 11/2006 |
| JP | 2003/317089 A | 11/2003 |
| JP | 2006505794 T | 2/2006 |
| MX | PA05004987 | 2/2006 |
| SG | 2005/03341 | 5/2007 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | PCT/US2008/52804 | 2/2007 |
| WO | PCT/US2008/054125 | 2/2007 |
| WO | WO/2008/028040 | 3/2008 |
| WO | PCT/US11/043059 | 5/2012 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in The Grass GIS", Geoscience and Remote Sensing Symposium, 4:2227-2229, 1991.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.

Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

"RGB Spectrum Videographics Report, vol. 4, No. 1, McDonnell Douglas Integrates RGB Spectrum Systems in Helicopter Simulators", pp. 1-6, 1995.

RGB "Computer Wall", RGB Spectrum, 4 pages, 1995.

"The First Scan Converter with Digital Video Output", Introducing . . . The RGB/Videolink 1700D-1, RGB Spectrum, 2 pages, 1995.

ERDAS Field Guide, Version 7.4, A Manual for a commercial image processing system, 1990.

"Image Measurement and Aerial Photography", Magazine for all branches of Photogrammetry and its fringe areas, Organ of the German Photogrammetry Association, Berlin-Wilmersdorf, No. 1, 1958.

"Airvideo Analysis", MicroImages, Inc., Lincoln, NE, 1 page, Dec. 1992.

Zhu, Zhigang, Hanson, Allen R., "Mosaic-Based 3D Scene Representation and Rendering", Image Processing, 2005, ICIP 2005, IEEE International Conference on 1(2005).

Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.

Mostafa, et al., "Ground Accuracy from Directly Georeferenced Imagery", Published in GIM International vol. 14 N. Dec. 12, 2000.

Mostafa, et al., "Airborne Direct Georeferencing of Frame Imagery: An Error Budget", The 3rd International Symposium on Mobile Mapping Technology, Cairo, Egypt, Jan. 3-5, 2001.

Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.

Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Artes F., & Hutton, J., "GPS and Inertial Navigation Delivering", Sep. 2005, GEOconnexion International Magazine, p. 52-53.

Pos AV "Digital Frame Camera Applications", 3001 Inc., Brochure, 2007.

Pos AV "OEM System Specifications", 2005.

"POSTrack V5 Specifications" 2005.

"Remote Sensing for Resource Inventory Planning and Monitoring", Proceeding of the Second Forest Service Remote Sensing Applications Conference—Slidell, Louisiana and NSTL, Mississippi, Apr. 11-15, 1988.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.

"Standards for Digital Orthophotos", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

Myhre, "ASPRS/ACSM/RT 92" Technical papers, Washington, D.C., vol. 5 Resource Technology 92, Aug. 3-8, 1992.

Rattigan, "Towns get new view from above," *The Boston Globe*, Sep. 5, 2002.

Mostafa, et al., "Digital image georeferencing from a multiple camera system by GPS/INS," *ISP RS Journal of Photogrammetry & Remote Sensing*, 56(I): I-12, Jun. 2001.

Dillow, "Grin, or bare it, for aerial shot," *Orange County Register* (California), Feb. 25, 200I.

Anonymous, "Live automatic coordinates for aerial images," *Advanced Imaging*, 12(6):51, Jun. 1997.

Anonymous, "Pictometry and US Geological Survey announce—Cooperative Research and Development Agreement," Press Release published Oct. 20, 1999.

Miller, "Digital software gives small Arlington the Big Picture," *Government Computer News State & Local*, 7(12), Dec. 2001.

Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.

Reed, "Firm gets latitude to map O.C. in 3D," *Orange County Register* (California), Sep. 27, 2000.

Reyes, "Orange County freezes ambitious aerial photography project," *Los Angeles Times*, Oct. 16, 2000.

Pointer, "Architecture for Airborne Applications," *Advanced Imaging Pro*, Jun. 2010.

"Instantaneous Remote Sensing Data Receiving and Processing for Emergency Response," *SBIR/STTR* SBIR Topic No. H-SB06.1-006, 2006.

| Events as they Occur | Link in Use | When they arrive | | What is sent through |
| --- | --- | --- | --- | --- |
| | | On HS | On LS | |
| 1001 | HS | | | |
| 1002 | HS | 1001 | | 1001 |
| 1003 | HS | 1002 | | 1002 |
| 1004 | HS | 1003 | | 1003 |
| 1005 | None (HS interrupted) | | | |
| 1006 | None (LS initiated) | | | |
| 1007 | LS | | | |
| 1008 | LS | | | |
| 1009 | LS | | | |
| 1010 | LS | | | |
| 1011 | LS | | 1007 | 1007 |
| 1012 | LS | | 1008 | 1008 |
| 1013 | LS (HS reinitiated) | | 1009 | 1009 |
| 1014 | LS / HS | 1013 | 1010 | 1013 |
| 1015 | LS / HS | 1014 | 1011 | 1014 |
| 1016 | LS / HS | 1015 | 1012 | 1015 |
| 1017 | HS (LS terminated) | 1016 | | 1016 |
| 1018 | HS | 1017 | | 1017 |
| 1019 | HS | 1018 | | 1018 |
| 1020 | HS | 1019 | | 1019 |

FIG. 10

```xml
<?xml version="1.0" encoding="UTF-8"?>

<imageNotification
imageID="D:\Pictometry\ShotData\21Y_C_090708\WVBERK_TS908_21Y_475C_090708\WV
BERK028055NeighOrtho4945_090708.RAW" special="false">

<missionID> Pictometry-Test</missionID>

<layer>VIS</layer>

<dateTime>2009-07-08T18:04:03.250-05:00</dateTime>

<frameCount>000000632</frameCount>

<corners>

<topLeft  lat=" 0.688717" lon="-1.361167"/>

<topRight lat=" 0.688697" lon="-1.361165"/>

<botRight lat=" 0.688694" lon="-1.361202"/>

<botLeft  lat=" 0.688714" lon="-1.361205"/>

</corners>

<rowNum>1</rowNum>

<colNum>1</colNum>

</imageNotification>
```

Figure 13

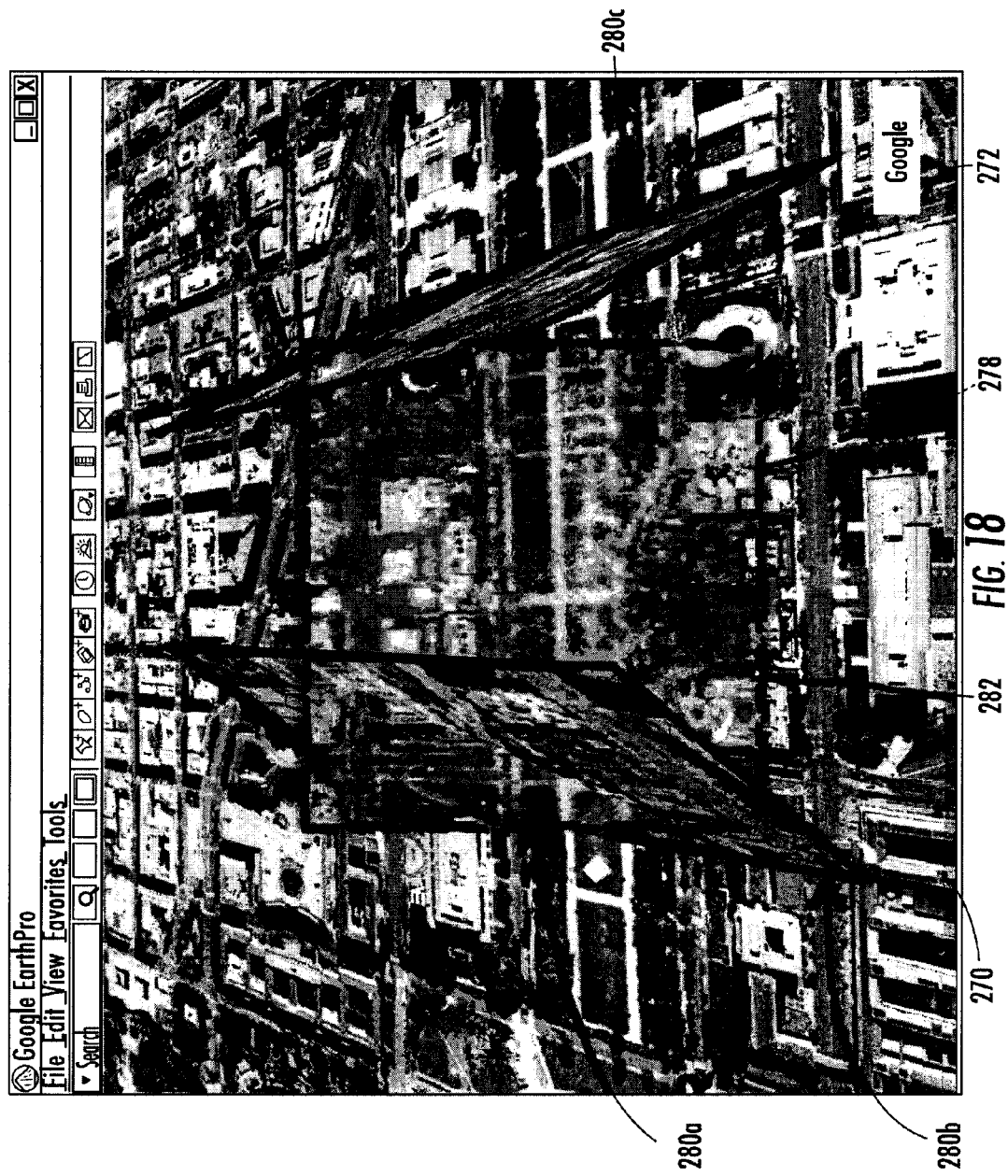

REAL-TIME MOVING PLATFORM MANAGEMENT SYSTEM

STATEMENT REGARDING FEDERALLY SPONSORED RESEARCH AND DEVELOPMENT

This invention was made with government support under SBIR/STTR topic number H-SB06.1-006 and/or contract number NBCH080046 awarded by the Department of Homeland Security Advanced Research Projects Agency. The government has certain rights in the invention.

CROSS-REFERENCE TO RELATED APPLICATIONS

Not applicable.

BACKGROUND OF THE INVENTION

As background, in the remote sensing/aerial imaging industry, imagery is used to capture views of a geographic area and to be able to measure objects and structures within the images as well as to be able to determine geographic locations of points within the image. These are generally referred to as "geo-referenced images" and come in two basic categories:

Captured Imagery—these images have the appearance they were captured by the camera or sensor employed.

Projected Imagery—these images have been processed and converted such that they confirm to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a vertical or nadir image—that is, an image captured with the camera pointing straight down. It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

Because the rectilinear grids used for the ortho-mosaic are generally the same grids used for creating maps, the ortho-mosaic images bear a striking similarity to maps and as such, are generally very easy to use from a direction and orientation standpoint. However, because the images are captured looking straight down, most people have difficulty determining what they are seeing since people rarely see the world that way. There is an entire discipline dedicated to working with vertical or nadir imagery known as photo interpretation which teaches people how to read subtle clues in the image to make a determination of what the object they are seeing might be.

It is for this reason that Pictometry created fully geo-referenced oblique imagery. Like ortho-rectified nadir images, these images have the ability to support measurements, determine locations, measure heights, and overlay annotations and GIS data. However, they are captured at an oblique angle so that they capture not only the top of structures and objects, but also the sides as well. This is a much more natural view that allows anyone to use aerial imagery—it eliminates the need to train in photo interpretation or have years of experience in order to make confident assessments regarding the content of the imagery. U.S. Pat. No. 5,247,356 describes a preferred embodiment of their initial oblique image capture system. Since then, significant improvements have been made to the system, still based on the '356 patent. The current system is capable of capturing five views simultaneously: four oblique views, each oriented roughly along the four cardinal directions, plus a nadir view capturing the area directly below the aircraft. All the images captured by this system are full geo-referenced in real-time and then can be post-processed to increase the accuracy of the geo-referencing.

In producing the geo-referenced aerial images, hardware and software systems designed for georeferencing airborne sensor data exist and are identified herein as a "POS", i.e., a position and orientation system. For example, a system produced by Applanix Corporation of Richmond Hill, Ontario, Canada and sold under the trademark "POS AV" provides a hardware and software system for directly georeferencing sensor data. Direct Georeferencing is the direct measurement of sensor position and orientation (also known as the exterior orientation parameters), without the need for additional ground information over the project area. These parameters allow data from the airborne sensor to be georeferenced to the Earth or local mapping frame. Examples of airborne sensors include: digital aerial cameras, multi-spectral or hyper-spectral scanners, SAR, or LIDAR.

The POS system, such as the POS AV system, is mounted on a moving platform, such as an airplane, such that it is held firmly in place relative to the sensors for which it is measuring position and orientation. By doing such, a single POS system can record the position and orientation of multiple sensors. In addition, if the POS system incorporates GPS or GLONASS, an antenna is mounted on the platform such that it has a clear view of the sky in order to receive signals from a satellite constellation. If the system incorporates an angular measurement capability, such as a fiber optic gyro, mechanical gyro, mechanical tilt sensor, or magnetometer, these systems must be mounted in a manner that holds them firmly in place relative to the sensors for which they are measuring orientation. If measurements must be taken more frequently than the actual measured positions and orientations then a highly accurate clock is incorporated and a means to record the precise clock time of any sensor capture event is integrated. For instance, with a shutter based camera, an electrical signal can be sent at the time the shutter is fully open triggering the POS system to record the precise time on the clock for that sensor capture event.

In the past, the images and the time and position data were stored on hard drives in the airplane and were post processed and made available to users after the airplane landed. This process could take days or even weeks before geo-referenced images were made available to users. Normally, these time periods are within the relevant time-frame. However, after a disaster occurs, this is not necessarily the case.

In the past, post-disaster metric aerial oblique imagery has been captured and processed and is very useful to first responders and to those responsible for rebuilding. This is especially true for hurricanes and floods where the oblique imagery shows the height the water has reached up the sides of buildings—something difficult to ascertain from traditional straight down orthogonal imagery.

During the aftermath of Hurricane Katrina, a new need was discovered: the need to determine the immediate extent of the flooding and damage and relay that to the first responders in the field. While Hurricane Katrina left a large swath of destruction, some areas were more devastated than others. What would have been extremely useful was to conduct an overflight, transmit that data directly to the ground, allow first responder specialists to look at the imagery and select the most affected areas or other critical pieces of infrastructure such as evacuation routes that might possibly be blocked, and have the aircraft capture those areas in more detail.

The presently disclosed and claimed invention was created in response to that need. The work was driven by the Department of Homeland Security (DHS) which asked for a system that could perform real-time georeferencing of aerial imagery and then transmit the images to the ground for display in a Geographic Information System (GIS). The patent owner, i.e., Pictometry, was awarded a Small Business Innovation Research (SBIR) grant to create such a system for DHS and FEMA—the Federal Emergency Management Administration. The presently disclosed and claimed inventive concepts go beyond the needs and specifications of the SBIR and adds the ability to do these tasks with sensor data such as but not limited to metric oblique imagery, as well as straight down orthogonal imagery.

Satellite image capture systems exist, but while they have the ability to transmit from the sensor to the ground, this does not immediately get the information into the first responders in the field. First, the satellite cannot loiter over an area, e.g., fly multiple contiguous flight paths—it must maintain its orbit and therefore only comes by a particular geographic region every so often. Even with the ability to task the sensors on the satellite that generally only widens the window of opportunity over the target or increases the frequency over the target—it still does not allow it to loiter about a predetermined ground area. Second, even if a satellite image capture system could loiter, because satellites fly so high over the earth, any cloud cover will obstruct their view of the ground. Since there is typically a lot of cloud cover after weather related disasters, such as hurricanes, floods, and tornadoes, this presents a serious problem, further compounded by the satellites inability to loiter. Third, many satellites download the data in a batch format when they are passing over an appropriate receiving station, rather than downloading images in real-time to a van or other ground station on site at the emergency response center. Fourth, most satellite data requires significant post-processing in order to put the images into a form that can be readily understood or used by the Geospatial Information Systems (GIS) and Computer Aided Dispatch (CAD) systems the first responders use during emergency response.

Traditional aerial image fliers do not provide the captured data directly into the hands of the first responders in the field in real-time for a variety of reasons. First, the data rates off the sensor are generally prohibitive for successfully transmitting data to the ground in real-time. Second, the imagery typically needs to be ortho-rectified in order to make it usable in GIS and CAD systems. Third, there was no known and available direct download systems in the industry capable of reliably downloading the data from the airplane to the ground. Fourth, the data is normally captured from directly overhead which is a view that first responders are not used to seeing. GIS experts typically take courses in photo interpretation in order to learn how to recognize structures and details from straight down imagery. Few first responders have had this education or the requisite experience.

With respect to the downloading of the captured data from an airplane to the ground, conventional methodologies include manually aiming a dish antenna in the general direction of a moving remote platform and then fine-tuning the aiming utilizing the signal strength of the incoming signal. This works acceptably for remote platforms such as airships that are hovering over a fixed location. However, this is often impractical or unreliable for communicating with a communication system carried by an airplane used to capture images with the aid of a flight plan in response to a disaster and which may be travelling more than 25 miles away from the dish antenna. Further, the conventional methodologies did not provide an automated method for reestablishing a connection or data synchronization problems after a drop-out of the high speed link.

Thus, there is a need for a system that can capture, process (e.g., develop and geo-reference) and download sensor data such as but not limited to metric oblique aerial images in real-time for use by first responders in response to a natural or man-made disaster. It is to such a system that the presently disclosed and claimed inventive concepts are directed.

BRIEF DESCRIPTION OF THE DISCLOSURE

The real-time moving platform management system described in this document overcomes all these limitations of the prior art methodologies discussed above.

Exemplary systems will be discussed below. In general, the system is designed to communicate data between a moving platform system and a ground station system. The moving platform system is suitable for mounting and use on a moving platform. The moving platform is preferably an airplane, although it could be another type of airborne platform such as a helicopter or a water-based platform such as a ship. Other examples of the moving platform are discussed below.

The moving platform includes a sensor capture system, a non-line of sight communication system, a high-speed line of sight communication system, and a computer system. The non-line of sight communication system can be a satellite communication system, and the high-speed line of sight communication system can include an omni-directional antenna with a suitable communication controller.

The sensor capture system preferably includes a plurality of sensors, such as aerial oblique cameras pointed at the ground, and a position system monitoring the real-time, location of the moving platform and generating a sequence of time-based position data.

The computer system monitors the availability of the non-line of sight communication system and the high-speed line of sight communication system and initiates connections when the non-line of sight communication system and the high-speed line of sight communication system are available. The computer system also receives the sequence of time-based position data and transmits the sequence of time-based position data via the non-line of sight communication system and/or the high-speed line of sight communication system depending upon the availability of these systems.

The ground station system is preferably positioned in or near the site of the disaster and is provided with a non-line of sight communication system adapted to communicate with the non-line of sight communication system of the moving platform system; a high-speed directional line of sight communication system adapted to communicate with the high-speed line of sight communication system of the moving platform system; a computer system and a tracking device.

The computer system is adapted to monitor the real-time location and altitude of the moving platform by receiving the sequence of time-based position data from at least one of the non-line of sight communication system and the high-speed directional line of sight communication system of the ground station system, filtering the input from the non-line of sight communication system and the high-speed directional line of sight communication system of the ground station system to properly time-sequence at least a portion of the position data to generate a predicted position of the moving platform.

The tracking device is provided with a multi-axis assembly connected to the high-speed directional line of sight communication system, and one or more controller receiving the predicted position of the moving platform, and controlling the multi-axis assembly to aim the high-speed directional line of sight communication system to communicate with the high-speed directional line of sight communication system.

Once the high-speed directional line of sight communication link is formed, sensor data and positional data for geo-referencing the sensor data can be transmitted in real-time from the moving platform system to the ground station system.

In a preferred embodiment the sensor capture system can receive flight plans in real-time, direct a pilot or control system to loiter over a disaster area, and fly the moving platform at altitudes between 2,500 to 10,000 feet (preferably between 3,000 to 6,500 feet) which is under all but the lowest hanging clouds. The sensor capture system preferably uses small or medium format digital framing cameras that have a manageable data rate that can be downloaded through the high speed directional line of sight communications link. Preferably the moving platform system develops and geo-references the captured sensor data prior to downloading the captured sensor data to the ground station system using a direct registration methodology in real-time so that no additional processing is required in order to correctly position the data in GIS or CAD systems. The sensor capture system can manage multiple sensors, such as but not limited to four oblique cameras in addition to a vertical camera thus providing views that show the sides of structures and objects in the scene. This natural view allows first responders to instantly recognize what it is they are looking at and to make intelligent decisions based on that information.

The high speed direct line of sight communication link allows this information to be piped directly to the emergency response center or to a van at the site of the disaster. Thus a first responder knows what is happening now, not hours or even days past.

As discussed above, the line-of-sight communication system can be provided with an omni-directional antenna mounted on the aircraft and a tracking dish antenna mounted on the ground. The ground station system keeps the dish antenna aimed at the aircraft in order to enable the high-speed directional communication link through which images and metadata can be transmitted to the ground and through which new flight plans and flying directives can be transmitted to the aircraft.

The non-line of sight communication system can be utilized to initially determine the location of the aircraft, aim the high speed line of sight communication system's directional antenna, and communicate through periods of unavailability of the high speed link.

By adapting the computer system of the moving platform system to monitor the imagery and metadata collected and monitor the high speed directional communication link, the computer system automatically transmits new sensor data, such as oblique imagery down the link as it becomes available. This system also responds to commands and directives coming up the link and starts the proper processes as needed. This computer system also initiates the non-line-of-sight communication link (such as the satellite link) in the event the high-speed directional line-of-sight communication link is interrupted.

In a preferred embodiment, the ground station system can also display and process the sensor data in real-time as it comes down the high-speed directional communication link; allow the operator to measure and exploit the imagery; request full resolution imagery from the moving platform system since compressed imagery is typically automatically transmitted; as well as track the moving platform's position, orientation, and current status; and allow the operator to generate new flight plans and transmit them up to the moving platform. Moreover, the ground station system preferably includes an Internet connection so that data products created by the moving platform system and the ground station system can be posted in real-time to a web server and made available to multiple client systems via the Internet.

Though the systems described herein were initially designed for use in an aircraft, this approach also works for other moving platforms such as boats, cars, helicopters, or even hand carried systems. During development of the preferred embodiment, these components were successful in tracking a van driving on the streets and establishing a high speed communication link any time the van was in line of sight of the antenna, which in the tests was mounted atop a high hill. Because this system properly deals with the yaw, pitch, roll, X, Y, and Z of the moving platform, it is suitable for virtually any moving platform.

Thus, the real-time moving platform management system preferably creates a full end-to-end system capable of meeting the needs of first responders and emergency crews in an ongoing response to a natural or man-made disaster.

BRIEF DESCRIPTION OF THE SEVERAL VIEWS OF THE DRAWING

FIG. 10 is a timing diagram illustrating the transmission of a sequence of time-based position data, the reception of the sequence of time-based position data out of order, and the filtering of the received time-based position data to properly time-sequence the received time-based position data.

FIG. 13 is an exemplary XML file containing position data in accordance with certain versions of the presently disclosed and claimed inventive concepts.

DETAILED DESCRIPTION OF THE INVENTION

Figure 1:
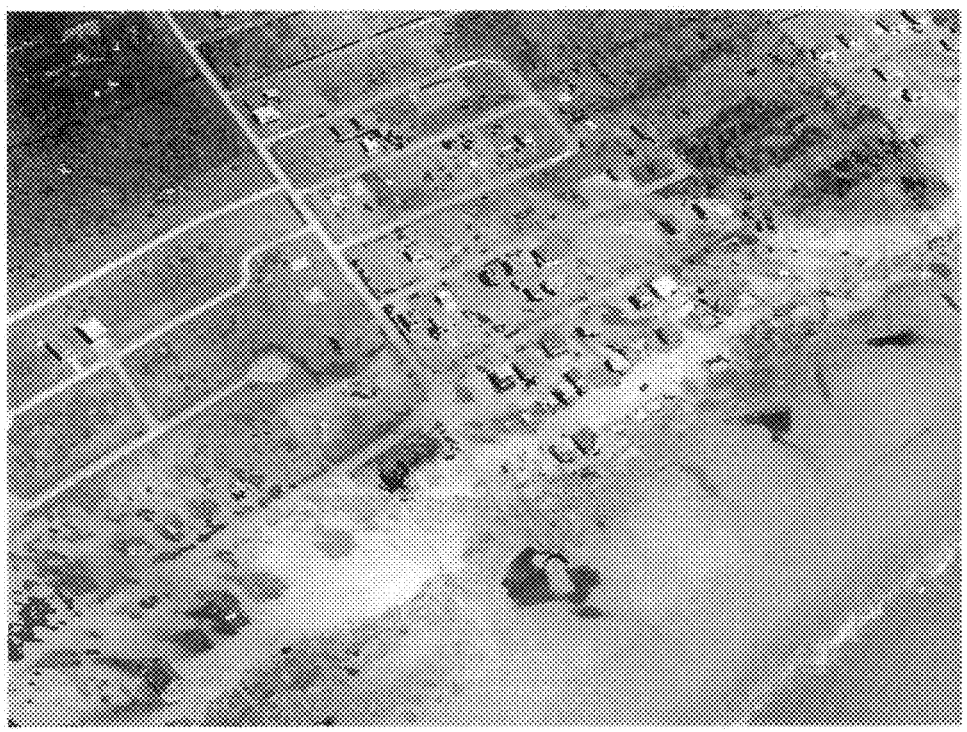
FIG. 1 is an oblique image of a portion of the coastline of Galveston Texas after hurricane Ike.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or being practiced or carried out in various ways. Also, it is to be understood that the phraseology and terminology employed herein is for purposes of description and should not be regarded as limiting.

Figure 2:
FIG. 2 is an oblique image of the same portion of the coastline of Galveston Texas before hurricane Ike.

Referring now to the drawings, FIGS. 1 and 2 are oblique images showing footage of a portion of the coastline in Galveston Tex. before and after Hurricane Ike. As shown in FIG. 1, the damage to Galveston Tex. was extensive and the Federal Emergency Management Agency was deployed immediately to the region in an emergency response effort.

In disasters, emergency response teams need to be provided with critical situational awareness information and to rapidly disseminate data to support decision-making in the early days of the disaster to speed response times and protect lives. Traditionally tasks such as these have been done by sending individuals into the field. However, this is a time-consuming and often dangerous assignment. When remote sensing data has been utilized it is often not current due to the extended time from data capture to data delivery. Space based systems can be used to capture data but are often limited due to resolution and cloud cover access to the target area. Aircraft have been utilized in the past but typically require hours or days of processing to permit data delivery to the client. These timelines are unacceptable when lives are at stake and rapid decisions are required.

Based on the experience from multiple hurricanes and man-made disasters, the Department of Homeland Security issued a small business innovative research grant for the development of a rapid response remote sensing system. The objective of the small business innovative research grant was to develop a system for rapid response that is capable of supporting large and small disasters. The goal of that system was to capture vertical or nadir image data and distribute it to those who need to make decisions within 15 seconds from the moment of capture to data received at a ground station so that data could be redistributed to the Internet at which point decision-makers across the United States would have access to data that is only minutes old.

The presently disclosed and claimed inventive concepts go beyond the scope and capability of that system by creating real-time geo-referenced metric oblique imagery and real-time geo-referenced elevation data, transmitting that information to the ground in real-time, and presenting it to the first responder in an easy to use and intuitive manner.

Figure 3:
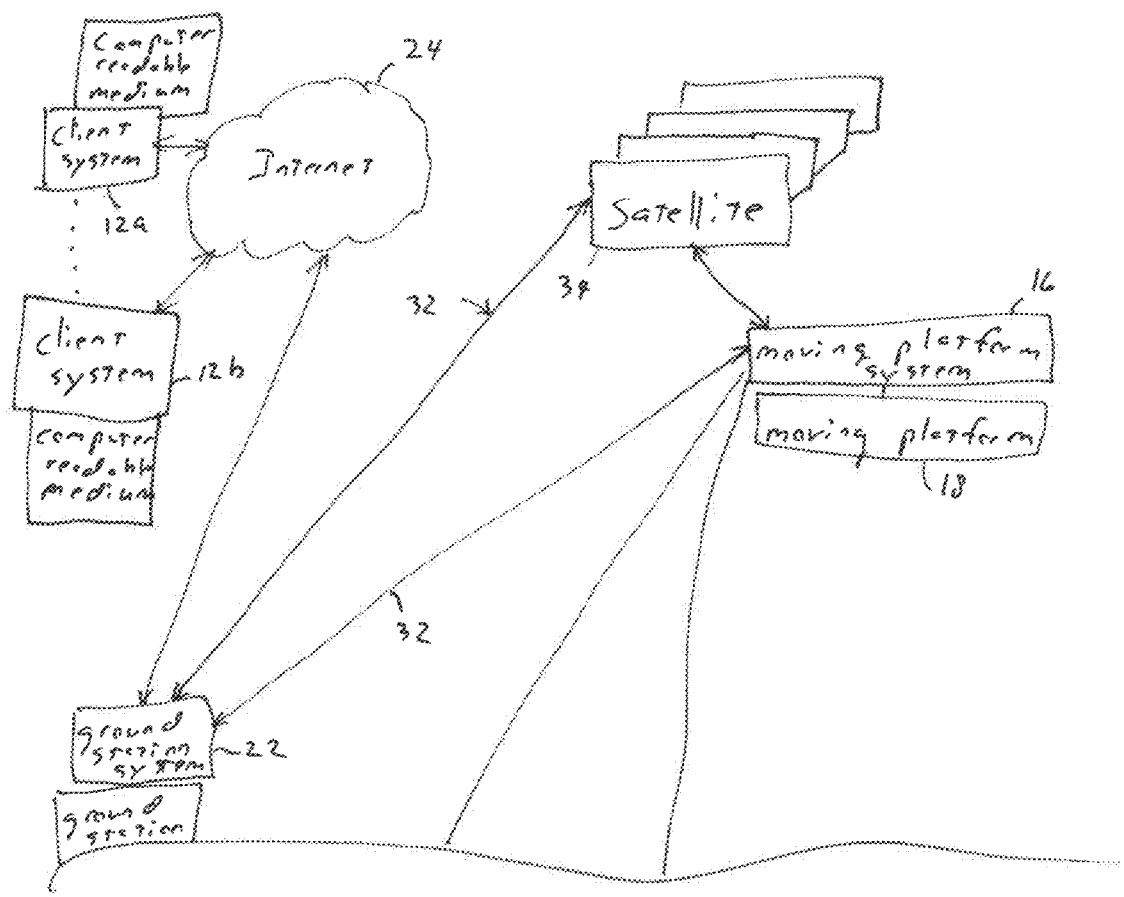
FIG. 3 is a block diagram of an exemplary real-time moving platform management system constructed in accordance with an embodiment of the present invention.

Referring now to FIG. 3, shown therein and designated by reference numeral 10 is a real time moving platform management system constructed in accordance with the present invention for capturing sensor data which is metric and distributing the sensor data in real time to decision-makers provided with or utilizing client systems 12 in real-time, e.g. within minutes of the capturing of the sensor data and preferably within 15 seconds of the capturing of the sensor data. The term "metric" is used herein to indicate that the sensor data, such as oblique imagery is geo-referenced, geographically accurate and capable of being measured within.

In general, the real-time moving platform management system 10 is provided with a moving platform system 16 carried by a moving platform 18 that captures sensor data of effected areas and passes the sensor data in real time to one or more ground station system 22 that automatically provides the sensor data to one or more client systems 12 preferably utilizing the Internet 24. Only two of the client systems are shown in FIG. 3 for purposes of clarity and are designated with the reference numerals 12A and 12B.

The client systems 12 can be implemented in a variety of manners and include a variety of types of input and output devices such as a mouse, a keyboard, a microphone, one or more display devices, one or more speakers, one or more printers, one or more network connections or the like. The client system 12 can be implemented as one or more computer or processor working either together or disparately to provide the functions described herein. The client system 12 can also be implemented as a portable device such as a cellular telephone, laptop computer, or template computer.

The moving platform 18 can be implemented in a wide variety of manners. For example, the moving platform 18 can be any type of device or system that can move through space in a predetermined, or random manner. Typically, the moving platform 18 is a manned airplane, but it should be understood that the moving platform 18 can be implemented in other manners. For example, the moving platform 18 can be implemented as an unmanned airplane, a train, an automobile such as a van, a boat, a ship, a four wheeler, a motor cycle, tractor, a robotic device or the like.

In general, the moving platform system 16 and the ground station system 22 preferably communicate data and control information via a high-speed line of site communication system 30 as shown in FIG. 3. When the high-speed line of sight communication system 30 is not available or connected, the ground station system 22 and the moving platform system 16 communicate via a non-line of sight communication system 32 that is depicted in FIG. 3 as a satellite-based system by way of example.

The sensor data captured by the moving platform system 16 can be of various types including, but not limited to, lidar, panchromatic image(s), color image(s), grayscale image(s) or infrared image(s). The images can be, but are not limited to, oblique images, orthogonal images, or nadir images, or combinations thereof. The sensor systems considered are typically medium or small format in nature. These types of sensor systems can provide low-cost collection capability and also typically generate the most common types of sensor data utilized by police, fire and emergency respondents.

Figure 4:
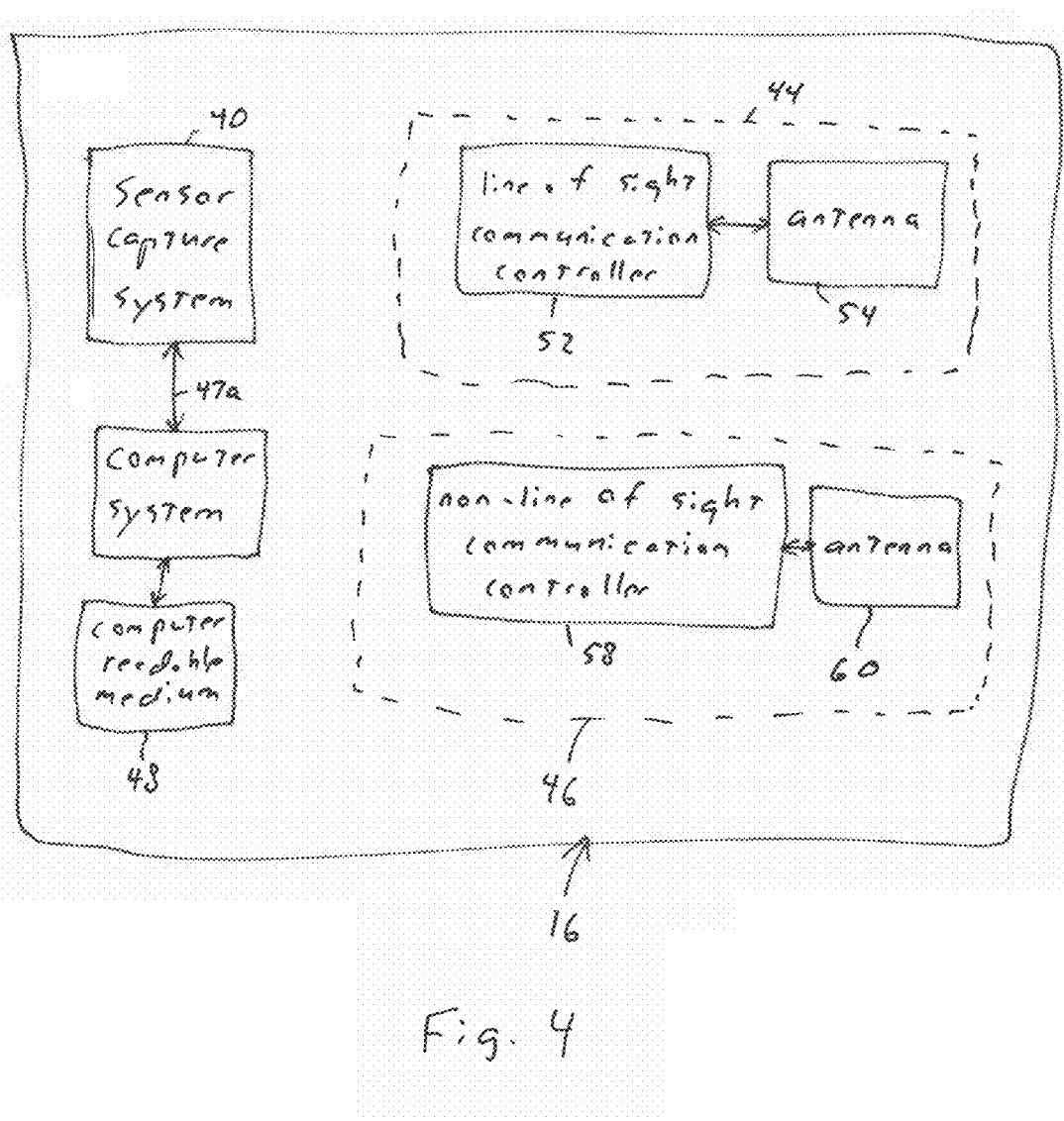
FIG. 4 is a block diagram of an exemplary platform system constructed in accordance with an embodiment of the present invention.

Referring to FIG. 4, shown therein is a block diagram of an exemplary moving platform system 16 constructed in accordance with the presently disclosed in claimed inventive concepts. In general, the moving platform system 16 is provided with a sensor capture system 40, a computer system 42, a line of site communications system 44, and a non-line of sight communication system 46. The sensor capture system 40 can be constructed in a similar manner as the image capture systems set forth in FIGS. 1, 2, 4 and 9 of the patent application identified by U.S. Ser. No. 12/031,576, including one or more image capture devices (1, 2, 3, 4, 5 or more), one or more monitoring systems, one or more event multiplexer systems, and one or more data storage units or computer systems.

By way of summary, each of the image capture devices has a sensor (not shown) for capturing sensor data, such as an image and is also provided with an event channel providing an event signal indicating the capturing of an image by the sensor. The event channel can be any device that provides a signal coincident with the capturing of the image, including, but not limited to, a flash output or other computer interrupt communicated via serial or other computer communication protocol. The sensor can capture the image in a digital manner or in an analog manner, and convert to a digital form. Further, it should be understood that the image can be stored electronically, magnetically, or optically.

The event multiplexer system of the sensor capture system 40 has at least one image capture input and at least one output port. In a preferred embodiment the event multiplexer system has at least two image capture inputs. Each image capture input receives signals from the event channel of one of the image capture devices. The event multiplexer system outputs event signals indicative of an order of events indicated by the signals provided by the image capture devices, and an identification (CID) of image capture devices providing the event signals.

The monitoring system records data indicative of the capturing of the images. For example, the monitoring system can record position data as a function of time, time data and/or orientation data. In the examples described in U.S. Ser. No. 12/031,576, the monitoring system records position data as a function of time, as well as time data and/or orientation data related to the moving platform. Preferably, the monitoring system automatically and continuously reads and/or records the data. However, it should be understood that the monitoring system can read and/or record the data in other manners, such as on a periodic basis, or upon receipt of a signal to actuate the monitoring system to obtain and record the data. For example, the event signals produced by the event multiplexer system can be provided to the monitoring system to cause the monitoring system to read and/or record the data indicative of position as a function of time related to the moving platform 18.

In the embodiments depicted in FIGS. 1 and 2 of U.S. Ser. No. 12/031,576, the monitoring system also includes a satellite receiver typically receiving position and timing signals from a satellite constellation, using any appropriate protocol, such as GPS or loran, although other types of position determining systems can be used, such as cell phone triangulation, e.g., Wireless Application Protocol (WAP).

The computer system of the sensor capture system 40 receives and stores (preferably in a database) the information indicative of the order of events indicated by the event signals, and identification of image capture devices providing the event signals. The computer system optionally also receives and stores the images (preferably in the database 38) generated by the image capture devices. The monitoring system records the data indicative of the capturing of images by storing it internally, outputting it to the computer system, or outputting such data in any other suitable manner, such as storing such data on an external magnetic or optical storage system. The position related to the moving platform 18 can be provided in any suitable coordinate system including, but not limited to, an X, Y, Z coordinate system, or a WGS1984 latitude/longitude coordinate system.

Further, the sensor capture system 40 can be provided with an orientation system, such as an inertial measurement unit for capturing other types of information with respect to the moving platform 18, such as the orientation of the moving platform 18. The inertial measurement unit can be provided with a variety of sensors, such as accelerometers (not shown) for determining the roll, pitch and yaw related to the moving platform 18. Further, it should be understood that the position and/or orientation information does not necessarily have to be a position and/or orientation of the moving platform 18. The position and orientation information is simply related to the moving platform 18, i.e. the position and/or orientation of the moving platform 18 should be able to be determined by the information recorded by the monitoring system. For example, the position and orientation information can be provided for a device connected to the moving platform 18. Then, the position and orientation for each image capture device can be determined based upon their known locations relative to the moving platform 18.

Further details regarding the construction of the sensor capture system 40 are set forth in U.S. Ser. No. 12/031,576 which is hereby incorporated herein by reference.

The computer system 42 can be constructed in a variety of manners and include a variety of types of input and output devices such as a mouse, a keyboard, a microphone, one or more display devices, one or more speakers, one or more printers, one or more network connections or the like. The computer system 42 can be implemented as one or more computer or processor working either together or disparately to provide the functions described herein.

The computer system 42 communicates with the sensor capture system 40, the line of sight communication system 44, and the non-line of sight communication system 46 utilizing the signal paths 47a, 47b, and 47c. The signal paths 47a, 47b, and 47c can be implemented in any suitable manner, such as wired or wireless communication links.

In general, the computer system 42 is provided with one or more computer readable medium 48 which stores computer executable instructions (e.g., software, firmware or the like), which when executed by the one or more computer or processor of the computer system 42 preferably cause the computer system 42 to: (1) enable the sensor capture system 42 to capture sensor data and positional data in real time and to save the sensor data and positional data to one or more directories of one or more computer readable medium 48 in real time; (2) monitor, in real time, the one or more directories of the one or more computer readable medium 48 for the sensor data and the positional data; and (3) transmit the sensor data and the positional data from the moving platform system 16 in real time to the ground station system 22 via the line of sight communication system 44 responsive to the sensor data and the positional data being detected as within the one or more directories, for example. It should be understood that the computer system 42 can be programmed to transmit the sensor data and the positional data from the moving platform system 16 responsive to other trigger(s) or event(s).

To provide the data products discussed herein in real time, it is important that the ground station system 22, and the moving platform system 16 communicate reliably while the moving platform system 16 is in motion. The ground station system 22 is typically stationary, but can also be movable and/or moving such as by mounting the ground station system 22 in a van or other vehicle.

In one embodiment, the ground station system 22 and the moving platform system 16 are adapted to communicate at distances upwards of 20 miles apart. Further, high-bandwidth is a requirement despite the ability of the moving platform system 16 to compress data. While compression methodologies of one bit per pixel from 8 to 12 bits of original data can be used, frame size and rates are high enough that channel bandwidth is an important consideration. For example, assuming that the moving platform system 16 is generating five data products per second, each from a 50 megapixel sensor, then 250 MB of data is being generated each second.

In general, the ground station system 22 and the moving platform system 16 are provided with corresponding high-bandwidth line of sight communication systems for downloading the data products from the moving platform system 16 in real time and for providing positional information of the moving platform system 16 to the ground station system 22 so that the ground station system 22 can track the location of the moving platform system 16 to maintain the high-bandwidth line of sight communication link. It should be noted that there are times when the high-bandwidth line of sight communication systems cannot communicate and for this reason the ground station system 22 and the moving platform system 16 are provided with corresponding non-line of sight communication systems for communicating positional information of the moving platform system 16 to the ground station system 22 for enabling the ground station system 22 to track the location of the moving platform system 16 to establish and/or maintain the high-bandwidth line of sight communication link there between.

The line of sight communication system 44 is generally provided with a line of sight communication controller 52 and an antenna 54. The antenna 54 is typically mounted to an exterior surface of the moving platform 18 so as to be able to communicate as discussed below. In general, the antenna 54 can be implemented in any manner suitable for communicating with a high-speed directional line of sight communication system 56 (shown in FIG. 5) of the ground station system 22. In one embodiment, the antenna 54 is implemented as an omni-directional antenna having a blade configuration. This permits the moving platform system 16 to operate in any orientation and communicate with the ground station system 22. A suitable antenna 54 can be a Model number 6040 obtainable from Harris Tactical Communications of Melbourne Fla.

The line of sight communication controller 52 can be a high-capacity (e.g., greater than 1 MB per second and preferably greater than about 40 MB per second and even more preferably greater than about 80 MB per second) line of sight radio adapted to provide point-to-point or point-to-multipoint wireless IP or ethernet infrastructure enabling high-bandwidth data communication between the ground station system 22 and the moving platform system 16 with distances preferably between 0 miles to 25 miles between the moving platform system 16 and the ground station system 22. A suitable line of sight communication controller 52 can be a RF-7800W and/or a RF-7800W-PA440 available from Harris Tactical Communications of Melbourne Fla.

The non-line of sight communication system 46 is generally provided with a non-line of sight communication controller 58 and an antenna 60. The non-line of sight communication system 46 is utilized for transmitting positional information of the moving platform system 16 to the ground station system 22. Since the non-line of sight communication system 46 is typically not designed for communicating the data products generated by the moving platform system 16, the non-line of sight communication system 46 can be provided with lower bandwidth requirements than the line of sight communication system 44. The non-line of sight communication system 46 can be implemented in any suitable manner, such as by using cellular links, or satellite-based communication links, the latter being preferred at medium to high altitudes.

When the altitude of the moving platform system 16 is expected to be above 2000 feet above the ground, then a satellite-based communication system is preferred. In particular, an Iridium-based method of data links communication was found to have ideal performance suitable for accurate low rate transmission for communicating the positional information with respect to the moving platform system 16, although other satellite-based methodologies can be used. The antenna 60 is typically mounted to an exterior surface of the moving platform 18 so as to be able to communicate as discussed herein. In general, the antenna 60 can be implemented in any manner suitable for communicating with a non-line of sight communication system 64 (shown in FIG. 5) of the ground station system 22. A suitable non-line of sight communication controller and antenna can be model nos. 9522A and AT1621-262W obtainable from Harris Tactical Communications of Melbourne Fla.

Figure 5:
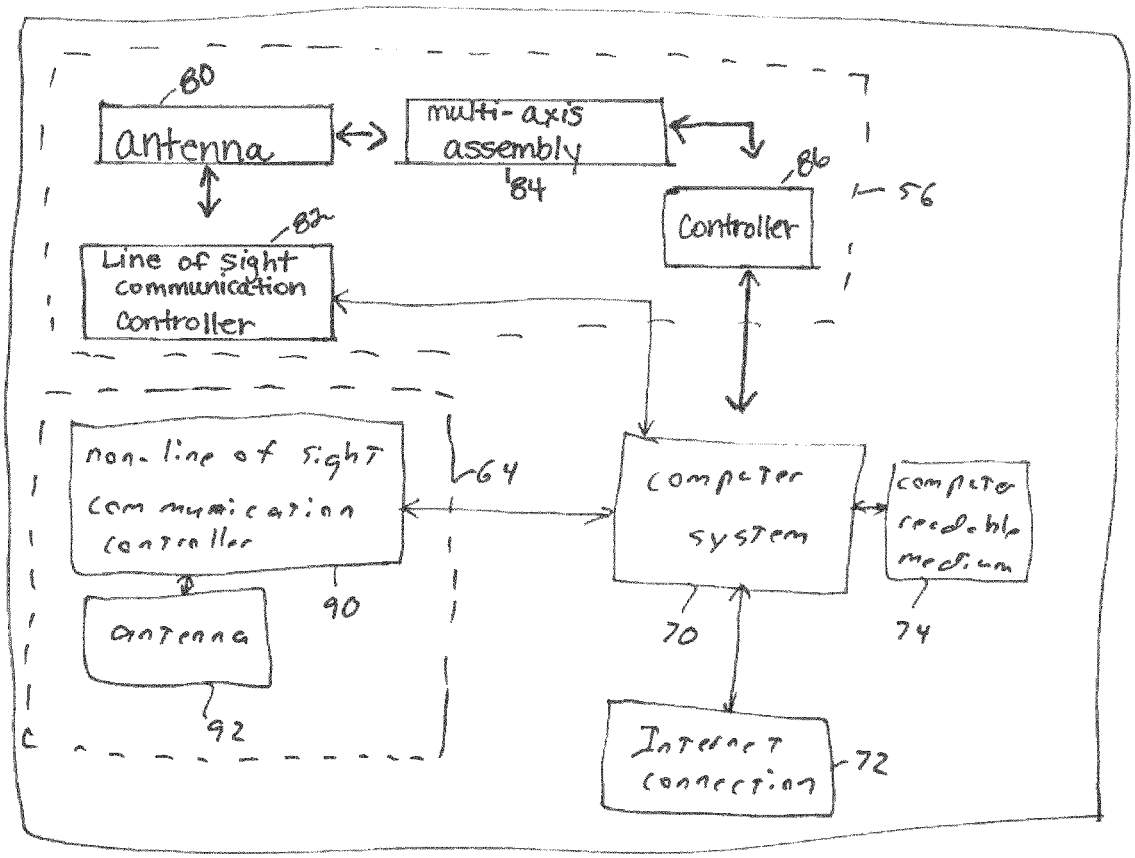
FIG. 5 is a block diagram of an exemplary ground station system constructed in accordance with an embodiment of the present invention for communicating with the platform system depicted in FIG. 4.

Referring now to FIG. 5, shown there in is a block diagram of one embodiment of the ground station system 22 constructed in accordance with the presently disclosed and claimed inventive concepts. In general, the ground station system 22 is provided with a computer system 70, the line of sight communication system 56, the non-line of sight communication system 64, and an Internet connection 72. The computer system 70 can be constructed in a similar manner as the computer system 42 discussed above and includes and/or accesses one or more computer readable medium 74 which stores computer executable instructions (typically software or firmware) which when executed by one or more processor of the computer system 70 causes the computer system 70 to monitor one or more communication links, i.e. the line of sight communication system 56, in real time for newly captured sensor data and positional data; save the newly captured sensor data and positional data to one or more directories of the one or more computer readable medium 74 in real time; monitor, in real time, the one or more directories of the one or more computer readable medium 74 for the newly captured sensor data and positional data; process the sensor data and positional data to create one or more data products for use by one or more mapping and exploitation systems; and store the one or more data products to one or more directories of the one or more computer readable medium 74.

As will be discussed in more detail below, the line of sight communication system 56 is provided with an antenna 80, a line of sight communication controller 82, a multiaxis assembly 84 connected to the antenna 80 for controlling the position and/or pointing direction of the antenna 80, and a controller 86 for receiving information related to the real-time position of the moving platform system 16 and generating control signals for causing the multiaxis assembly 84 to aim the antenna 80 at the antenna 54 for forming the high-speed line of sight communication system XX. The antenna 80 is preferably a uni-directional open-mesh dish antenna, so as to provide minimal air buffeting during dish motion or wind. A suitable antenna 80 can be a model no. RF-7800W-AT003 obtainable from Harris Tactical Communications of Melbourne Fla. Satisfactory results were obtained using a 4-foot dish antenna.

As noted above, the tracking of the moving platform 18 optimally improves signal strength and in turn the bandwidth is improved. The antenna 80 is aimed with the multi-axis assembly 84 and the controller 86. The controller 86 is designed to locate the antenna 54 of the moving platform system 16 utilizing a predicted position of the moving platform 18 utilizing a time-sequence of position data, such as but not limited to GPS data. Once provided with the predicted position of the moving platform 18, the controller 86 outputs control signals to the multiaxis assembly 84 for aiming the antenna 80 at the antenna 54.

The multiaxis assembly 84 is linked to the antenna 80, such as by connecting the multiaxis assembly 84 between two mechanical linkages, e.g., a base and a mast, supporting the antenna 80. The multiaxis assembly 84 can be constructed in a variety of manners and is preferably provided with one or more motor subsystems (not shown) controlling movement along multiple axes for aiming the antenna 80 at the antenna 54. A suitable kit containing a multi-axis assembly 84 and a controller 86 can be a model "Sure Shot IV" obtainable from Arizona Engineering of Phoenix and/or Flagstaff Ariz.

The line of sight communication controller 82 can be a high-bandwidth communication radio utilizing any suitable frequency range, such as but not limited to 4.4 to 5.0 GHz and is adapted to communicate with the line of sight communication controller 52 via the antennas 80 and 54. A suitable line of sight communication controller 82 can be a model nos. RF-7800W and/or RF-7800W-PA440 obtainable from Harris Tactical Communications of Melbourne Fla. The term "high-bandwidth" as used herein refers to communication capabilities greater than 1 Mb/second.

The non-line of sight communication system 64 is provided with a non-line of sight communication controller 90, and an antenna 92. In general, the non-line of sight communication controller 90 and the antenna 92 are selected to communicate with the non-line of sight communication controller 58 and the antenna 60 of the moving platform system 16 typically indirectly through either a cellular telephone network or a satellite network. When the non-line of sight communication system 46 is based on a satellite and/or iridium-based system, the non-line of sight communication controller 90 can be a satellite modem such as a model number 9522A, and the antenna 92 can be a model number PAA 0601 both of which are obtainable from Harris Tactical Communications.

The internet connection 72 can be used to deliver the data products to web-based users as quickly and cost effectively as possible after collection. Methods of sending the data from the ground station system 22 to the Internet include; wired, cellular, satellite and broadband radio. Each solution offers unique features, benefits and detriments. Solutions may be combined or may be in the form of multiple units to increase throughput. Testing has shown that cellular modems are too slow for the backhaul of the large amount of captured image data, for example, within typical data products. Due to the slow upload speeds, the cellular and satellite solutions are only viable should technology improvement occur. However, cellular modems are a possible consideration for single image broadcast to users in the field should services be maintained post disaster.

Broadband radios such as but not limited to the Harris 7800 discussed above are viable where a wireless solution is required. These radios maintain their high bandwidth but may require multiple unit installations daisy-chained until a wired Internet connection can be made. Since each wireless communication set up must be performed in pairs; daisy chains of these systems to reach the Internet can become costly. A line of site must also be maintained to insure communications. Harris Tactical Communications provides software to support this task.

In an embodiment, the real-time moving platform management system 10 is adapted to deliver data products quickly based on current situational needs. For example, by having an airborne oversight of a region, the real-time moving platform management system 10 can be utilized to more rapidly and safely guide responders in a disaster affected region.

Flight planning is one of the initial tasks upon deployment of the real-time moving platform management system 10. Traditionally, flight planning is a very labor-intensive process. It requires detailed understanding of the sensor, its platform, environmental conditions, target areas, and airspace restrictions. An emergency responder should not be required to have detailed familiarity with these metrics, nor should they need to be trained in the varied software suites required for flight planning.

Figure 6:
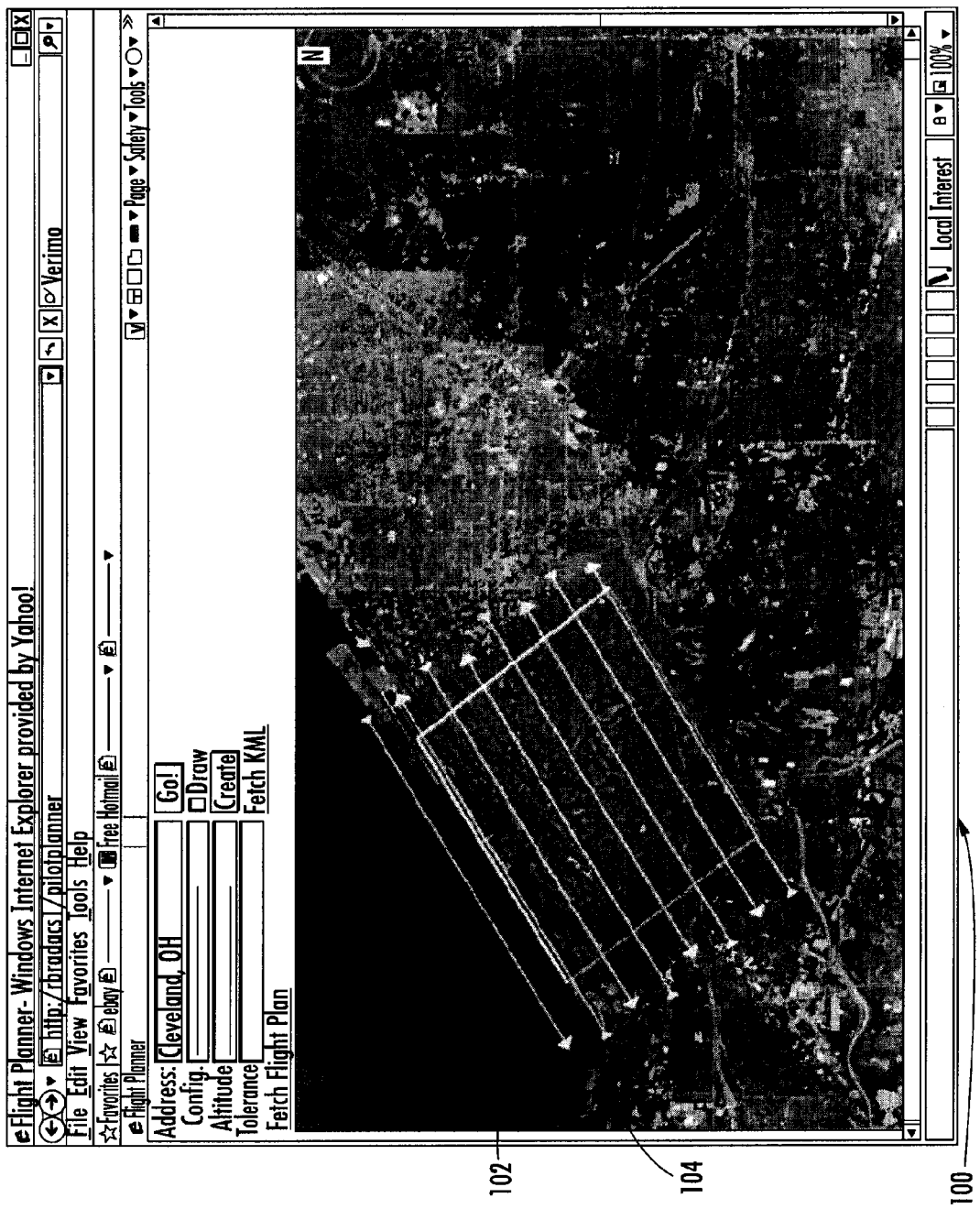
FIG. 6 is a diagrammatic view of a screen of a computer system of the ground station system illustrating a flight plan constructed in accordance with an embodiment of the present invention that can be uploaded to the platform system in real time and utilized to guide the moving platform to capture preselected sensor data.

With this in mind, shown in FIG. 6 is a diagrammatic view of a screen 100 of the computer system 70 of the ground station system 22 illustrating a flight plan 102 constructed in accordance with an embodiment of the presently disclosed and claimed inventive concepts that can be uploaded to the moving platform system 16 in real time and utilized to guide the moving platform 16 to capture preselected sensor data. The flight plan 102 includes a series of paths 104 for guiding the moving platform 18 and a plurality of waypoints (not shown) with each of the waypoints indicating a predetermined geographic area for capturing sensor data. The paths are shown by way of arrows in FIG. 6 with the arrows also showing the direction that the moving platform 18 will be guided. Only one of the paths is labeled with the reference numeral 104 for purposes of clarity. The flight plan 102 having the waypoints is used to guide the moving platform 16 while also controlling the sensor capture system 40 to obtain sensor data of the predetermined geographic areas.

Figure 6A:
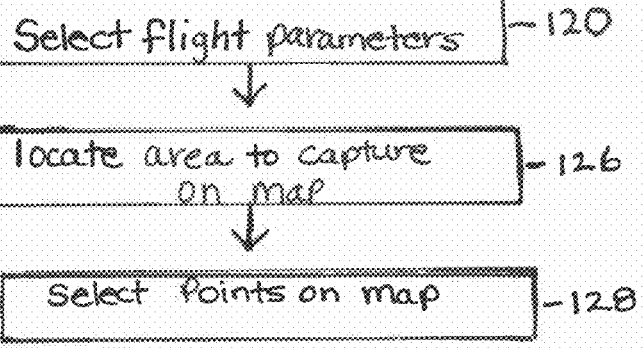
FIG. 6A is a flow diagram of a process for creating a flight plan in accordance with an embodiment of the present invention from the standpoint of a user utilizing the ground station system depicted in FIG. 5.
Figure 6B:
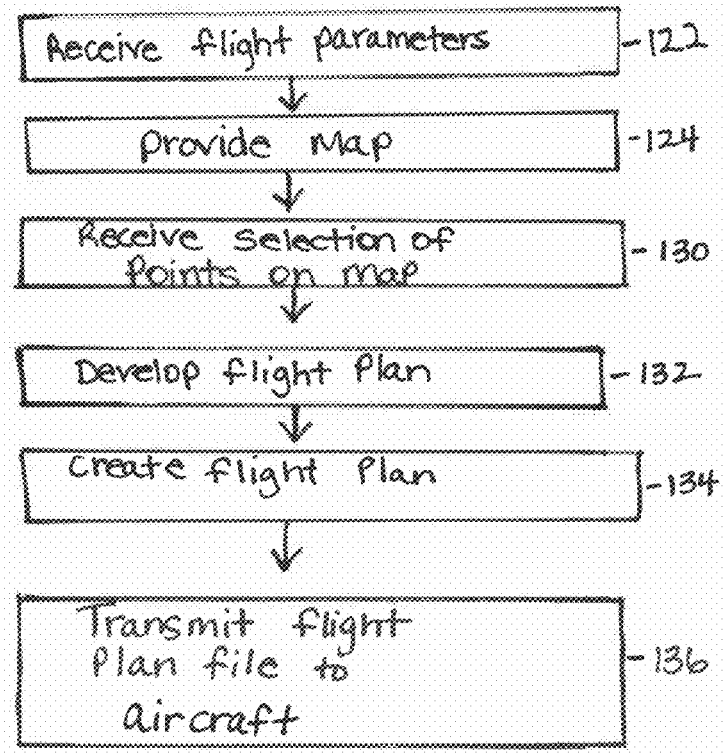
FIG. 6B is a flow diagram of another process for creating a flight plan in accordance with an embodiment of the present invention from the standpoint of depicted in FIG. 5.

In accordance with certain inventive concepts, an embodiment of a simplified graphical user interface (GUI) for flight planning real-time airborne data collection has been developed. Shown in FIGS. 6A and 6B are logic flow diagrams of methods for creating a flight plan in accordance with the presently disclosed and claimed inventive concepts. Initially, the user utilizes the computer system 70 to select certain flight parameters as shown by the block 120 and the computer system 70 receives the flight parameters as shown by the block 122. The computer system 70 then displays or provides a geospatial map as shown by the block 124. The user locates an area to capture on the geospatial map as indicated by the block 126, and then selects at least three points on the geospatial map as indicated by a block 128. It should be noted that in an embodiment the selection of the first two points determines the direction for flying the series of paths by making the paths parallel with a line passing through the two selected points.

The computer system 70 receives the selection of points on the geospatial map as indicated by a block 130, and then develops a flight plan as indicated by a block 132 taking into account the flight parameters selected by the user. The computer system 70 then creates a flight plan file as indicated by a block 134, and then transmits the flight plan file to the moving platform system 16 in real time as indicated by a block 136 utilizing the line of sight communication system 56. The flight plan file can be in any suitable format, such as but not limited to a binary format.

Figure 7:
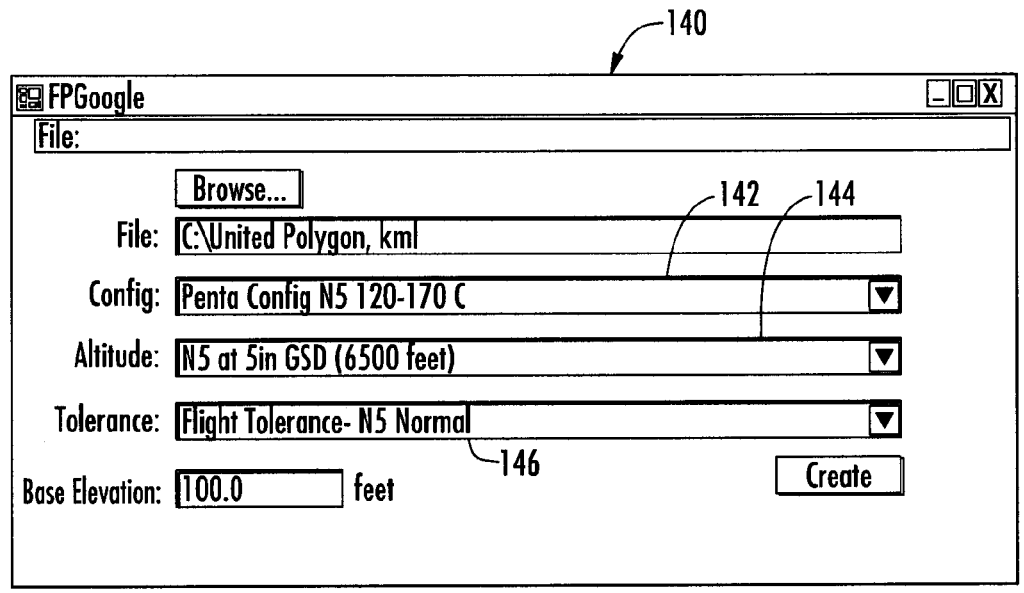
FIG. 7 is a view of the screen of the computer system of illustrating a step of selecting predetermined flight parameters.
Figure 8A:
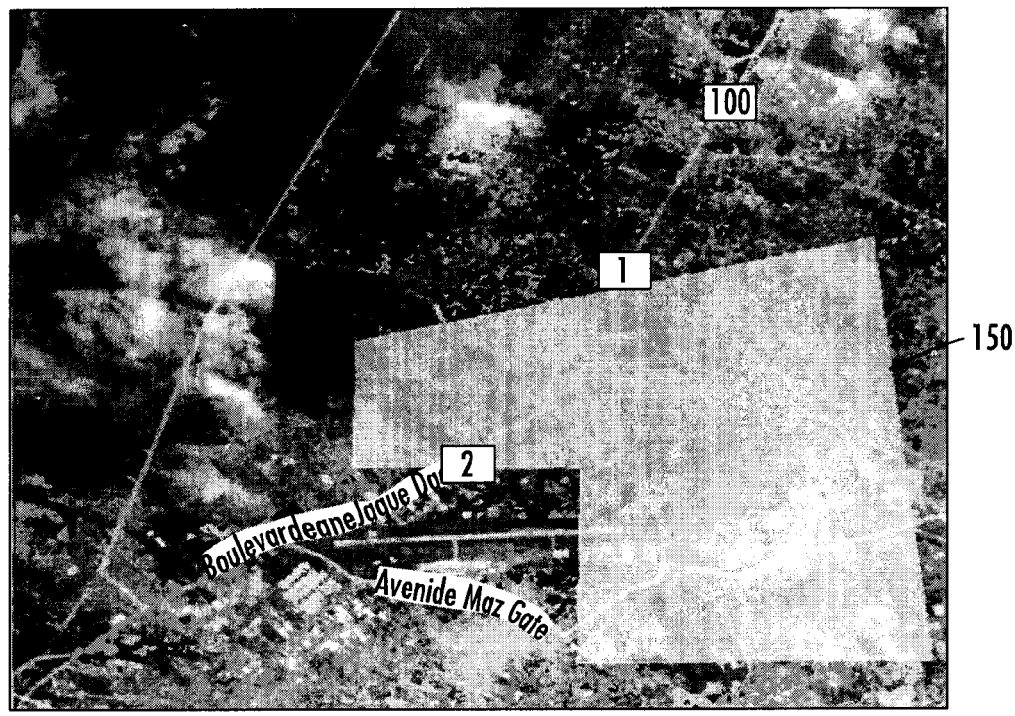
FIG. 8A is another view of the screen of the computer system of FIG. 6 illustrating a step of selecting points on a map to encompass a predetermined area for developing a flight plan in accordance with an embodiment of the present invention.
Figure 8B:
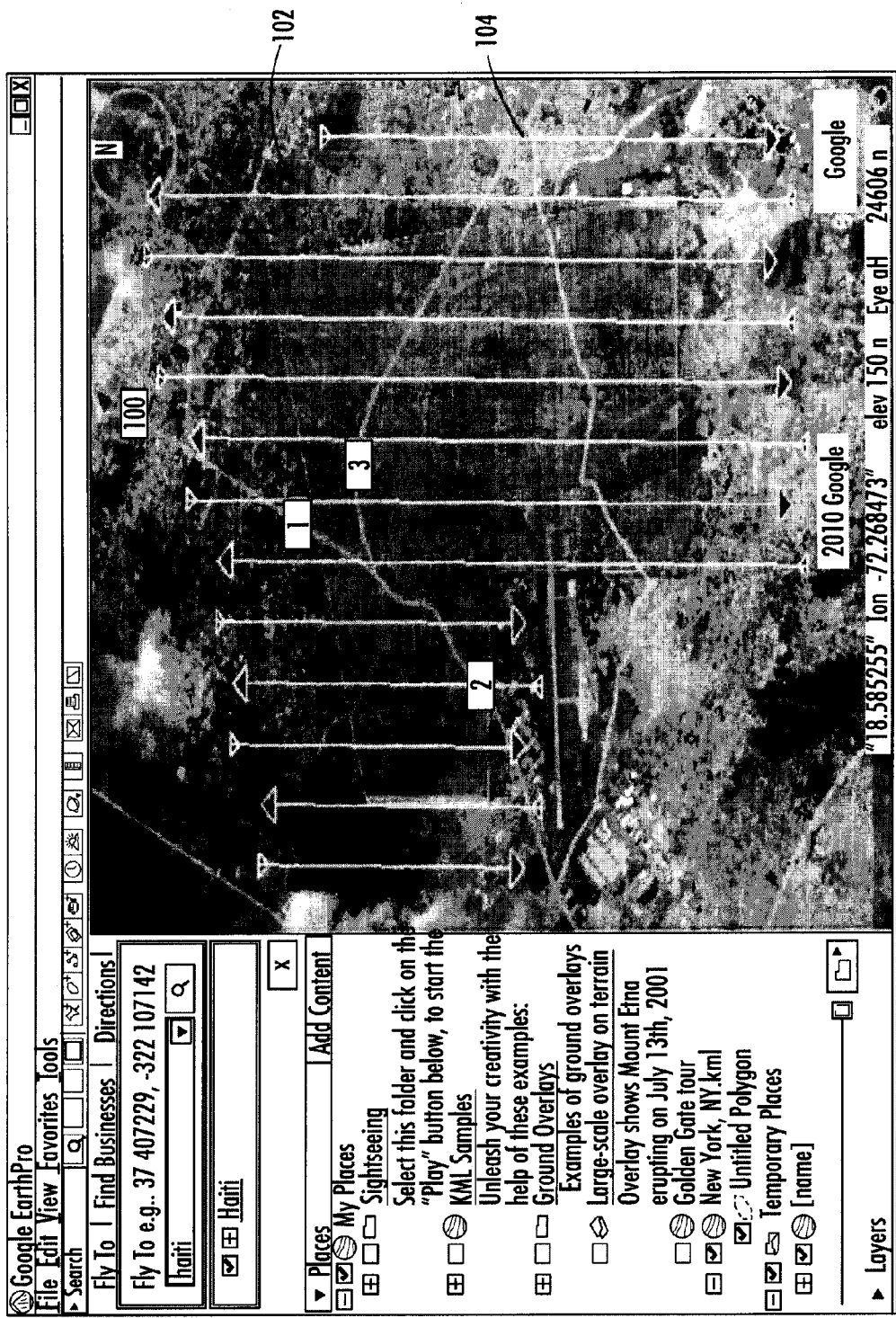
FIG. 8B is another view of the screen of the computer system of FIG. 6 illustrating a flight plan developed in accordance with the selected predetermined area depicted in FIG. 8A.

The system 10 can be adapted to take into account a variety of flight parameters as shown in FIG. 7. The flight parameters can include but are not limited to a number of sensor(s) mounted onto the moving platform 18, the type of sensors(s) mounted onto the moving platform 18, an altitude of the moving platform 18, and a flight tolerance or amount of overlapping coverage desired. In a preferred embodiment, the instructions running on the computer system 70 are adapted to cause the display of a flight planning screen 140 having a plurality of data fields 142, 144 and 146 with predetermined flight parameters that are selectable by the user. In the example shown in FIG. 7, (1) the data field 142 includes a plurality of selectable flight parameters directed to the combination of a number and configuration of sensor(s) to be controlled; (2) the data field 144 includes a plurality of selectable flight parameters directed to the altitude of the moving platform 18; and (3) the data field 144 includes a plurality of selectable flight parameters directed to flight tolerance or amount of overlap of the sensor data. The software running on the computer system 70 can be designed to provide additional data fields and/or pull-down menus for selecting and/or inputting flight parameters to give access to unique product and aircraft configurations, for example. The data fields or pull-down menus can be customized based on the sensors used.

As shown in FIG. 8, the selection of points on the geospatial map as indicated in the block 128 can be implemented in a variety of manners. For example, the user can simply drag a shape 150 or even a single line onto the geospatial map. The geospatial map may be a vector, raster or hybrid representation of the region. This is an important point since the representation should enable users unfamiliar with an area to flight plan. By having raster/vector and hybrid maps, a user can guide the moving platform 18 to possible disaster sites with greater accuracy and confidence. Raster content provides a historical sample of aerial or satellite data of the region.

Most data, even if generated from National Aerial Photography, Aerial Statewide or local data, will be under 5-years old. This will be true based on the national mapping program requirements in the US. In many cases, more current data will be available. As most events have at least minimal notice, this data, in concert with the most up-to-date elevation, will preferably be loaded into the system prior to deployment to the field.

Hybrid data sets in which vector content is overlaid, can be used for damage assessment. In many cases, areas will have been destroyed or flooded, leaving the user with no viable landmarks, or landmarks requiring familiarity with the region.

Data will likely have value post collection, as well. If the user is enabled with multiple temporal collections, they may be able to perform local change detection. Here a user can compare quickly before and after content. With data directly side by side or in overlay, users will be capable of more readily determining if the initial flight planned areas are those most affected. Again, time to response and response to those areas most affected is critical. This overlay will allow a higher altitude broad area coverage mission to sample multiple areas. Once the major impacts are determined, the higher resolution (smaller ground sample distance or GSD) data can be tasked.

Once the moving platform 18 is in the region, it can be re-vectored to new locations if it is determined that the initially selected areas are not those of primary impact. A user may also task the moving platform 18 to collect single or multiple flight lines initially. This allows a broad area survey, or a more detailed examination of a localized region. Tasking should take into account ground station placement. This is noted on the mapping. The moving platform system 16 is typically designed to communicate at ranges up to twenty-five miles from the ground station system 22. If flight plans are generated beyond this level, the moving platform system 16 may still collect the sensor data and then alert the user that the moving platform system 16 will be required to move within an effective line of sight communication range, e.g., twenty-five miles, for example, at some point to download captured data. Multiple ground station systems 22 may also be deployed with hand-off automatically between them. This can be used to extend the coverage of near live data transmission and review.

As shown in FIG. 8, a user has outlined an area and the software has automatically added overlap to insure coverage due to wind impacts on sensor roll, pitch and yaw. It has also taken elevation into account to help insure no data gaps, are introduced in the collection due to a change in the height over ground caused by varying terrain. Each individual sensor has been noted with its associated image footprint on the ground. When zoomed, each individual frame may be seen and/or noted. The individual frames will become the actual images captured and downloaded in real-time to the ground station system 22 from the moving platform system 16.

The software and/or computer hardware for implementing the flight planning algorithms described herein can be designed to provide a web-based solution using the computer system 70 and/or a client system 12 as an input/output interface for the user, and/or a stand-alone solution where the computer system 70 and/or the client system 12 is generating the flight plan. For example, the software and/or computer hardware can be designed to generate flight plans from a polygon that has been exported in a KML format to work with a stand-alone map visualization computer program such as Google Earth. In addition, the selected area can be saved in a suitable format, such as KML and then imported into a separate KML flight planning tool. The tool generates a flight plan in a binary format suitable for the capture system running on the moving platform 18, as well as a KML file that depicts the flight lines and shot polygons in KML format, for example.

These flight plans enable the user to simulate the flight paths and its associated imagery for more accuracy of the depicted area. To create a flight plan, the user drops a shape or box over the effected area and the software will generate a plan according to the capture systems on the available moving platform 18. The capture systems may differ between moving platform 18, from the focal length of the lens, array, orientation of cameras, and flight height. All of these features can be taken into account by the software tools.

Figure 9:
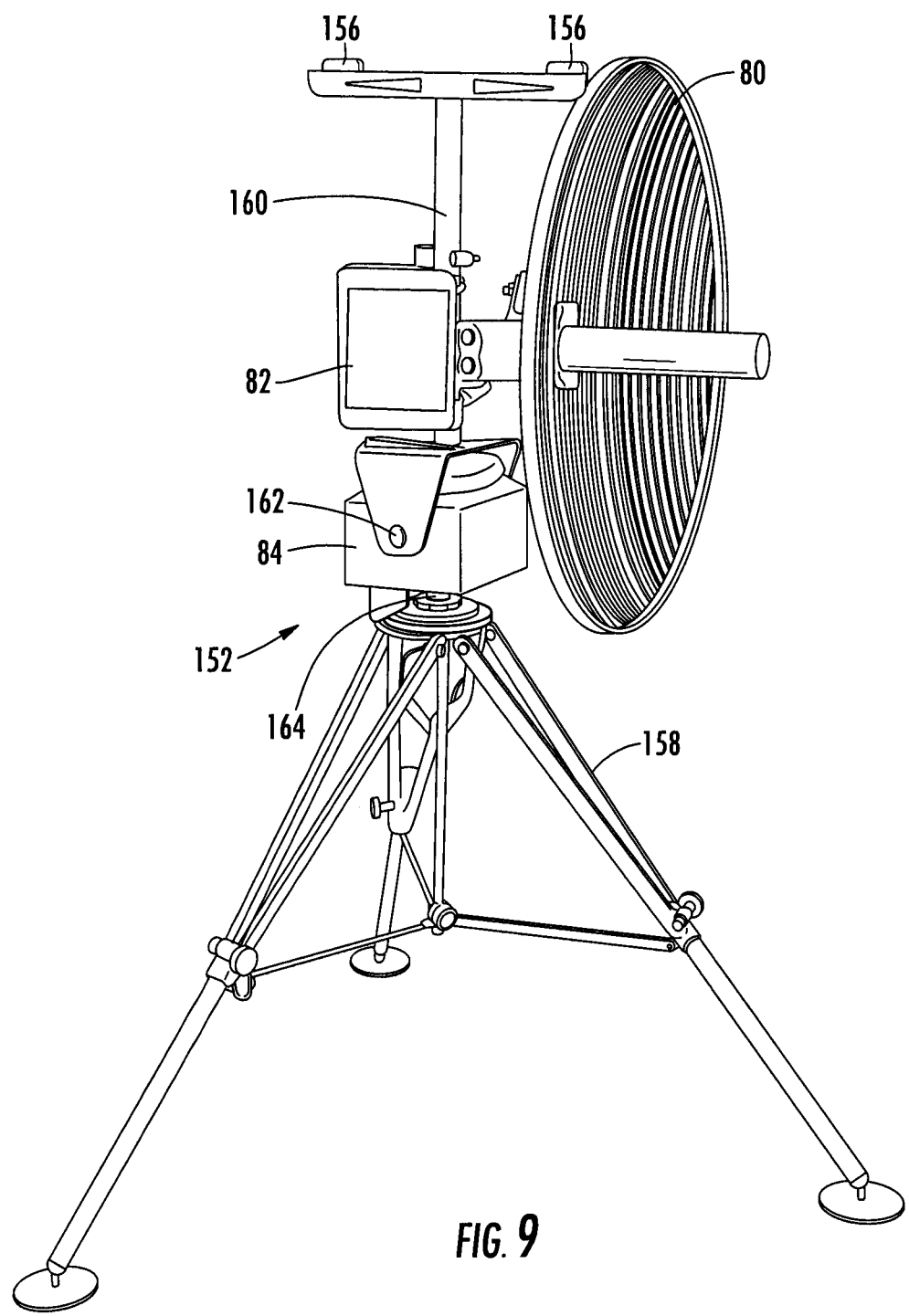
FIG. 9 is a perspective view of an exemplary tracking device of the ground station system.

FIG. 9 is a perspective view of an exemplary tracking device 152 of the ground station system 22. The tracking device 152 includes the antenna 80, the multi-axis assembly 84, the line of sight communication controller 82, and at least two alignment antennas 154 and 156 used for determining the current pointing direction of the antenna 80. In this example, the multi-axis assembly 84 is connected between a base 158 (e.g., a tripod) and a mast 160 and includes a first bushing 162 for changing the vertical orientation of the antenna 80, and a second bushing 164 for changing the horizontal orientation of the antenna 80. The line of sight communication controller 82 can be mounted to the mast 160 so as to be movable with the antenna 80. In one embodiment, the alignment antennas 154 and 156 can be GPS antennas which are spaced apart a preselected distance and aligned with a center and/or or pointing direction of the antenna 80.

As discussed above, the non-line of sight communication system 46 of the moving platform system 16 makes a connection with the non-line of sight communication system 64 of the ground station system 22 to form the non-line of sight communication system 32. Position information is sent to the computer system 70 of the ground station system 22, and then the predicted position of the antenna 54 is provided to the controller 86 for forming the high speed line of sight communication system 30 via the systems 56 and 44. When the moving platform system 16 is communicating with the ground station system 22 with the non-line of sight communication system 32, there can be a latency period in the range of 3-10 seconds and more typically about 5 seconds.

However, when the moving platform system 16 is communicating with the ground station system 22 with the high speed line of sight communication system 30, then almost zero latency exists. Using two different communication systems with different latency periods can result in errors in aiming the antenna 80.

FIG. 10 is a timing diagram illustrating the transmission of a sequence of time-based position data (i.e., events 1001-1020), an indication of the communication system in use (i.e., HS refers to the high speed line of sight communication system 30, and LS refers to the non-line of sight communication system 32), the reception of the sequence of time-based position data being out of order due to the transition between the high-speed line of site communication system 30 and the non-line of sight communication system 32, and the filtering of the received time-based position data to properly time-sequence the received time-based position data. In a preferred embodiment, the time-based position data is fed directly from a GPS receiver in the moving platform 18, and provides a time stamp, as well as latitude, longitude, and altitude of the moving platform 18. As shown in FIG. 10, when the high-speed line of site communication system 30 is interrupted during event 1005, the non-line of sight communication system 32 is initiated and a four event latency exists, i.e., event 1007 is received during event 1011. When the high-speed line of site communication system 30 is re-initiated, data transmitted by the high-speed line of site communication system 30 is received prior to the data being transmitted by the non-line of sight communication system 32 which causes event 1013 to arrive before event 1011, for example. The computer system 70 is programmed to properly time-sequence at least a portion of the position data so that the most current position of the moving platform 18 can be determined or estimated. In this example, events 1010-1012 may be discarded since the event 1013 is more current.

Figure 11:
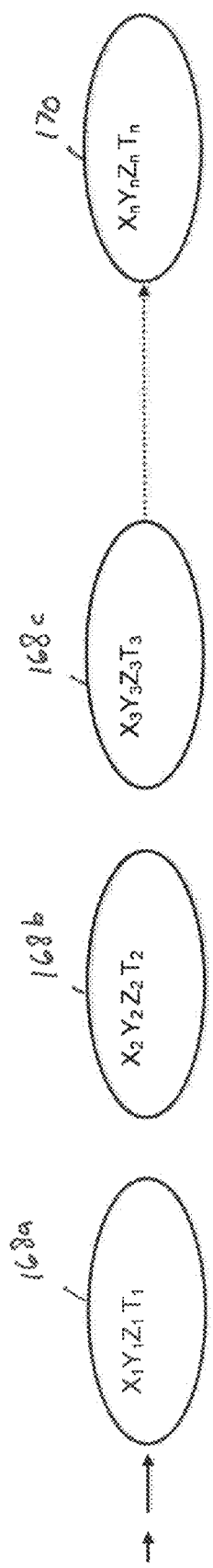
FIG. 11 is a diagrammatic view of a method for estimating the position of the moving platform utilizing the properly time-sequenced position data.

FIG. 11 is a diagrammatic view of a method for estimating the position of the moving platform utilizing the properly time-sequenced position data. Shown in FIG. 11 is a plurality of past positions 168a, 168b and 168c identified by the time-based position data of the moving platform 18 as well as an estimated or predicted position 170. The predicted position 170 can be calculated by calculating the angular velocity and direction of travel of the moving platform 18 using the past positions 168a, 168b and 168c and then extrapolating to calculate the predicted position 170 based on the current time. Any suitable extrapolation technique can be utilized such as by using a curve fitting algorithm such as but not limited to cubics or splines and then estimating forward to the current time. Although three past positions 168a, 168b and 168c are shown, it should be understood that more or less of the past positions can be used to calculate the estimated or predicted position 170. In general, increasing the number of the past positions as well as their time relative to the current time will increase the accuracy of the estimated or predicted position.

Figure 12:
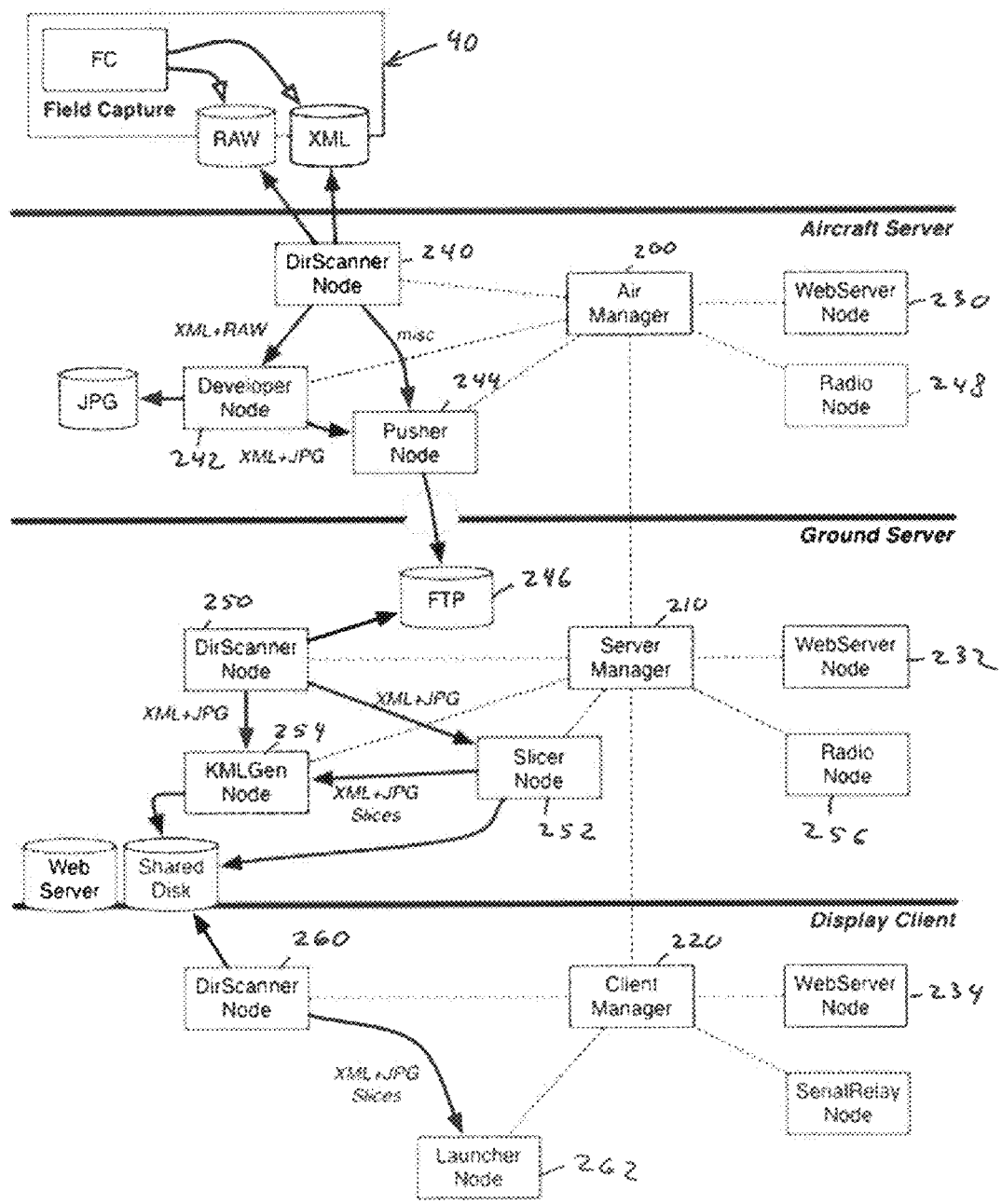
FIG. 12 is a block diagram of software and hardware of the real-time moving platform management system functioning together so as to generate sensor data, and position data and make geo-referenced sensor data displayed on a geospatial map of one or more client systems in real time in accordance with preferred aspects of the presently disclosed and claimed inventive concepts.

FIG. 12 is a block diagram of software and hardware of the real-time moving platform management system functioning together so as to generate sensor data, and position data and make geo-referenced sensor data to be displayed on a geospatial map of one or more client systems in real time in accordance with preferred aspects of the presently disclosed and claimed inventive concepts.

As discussed above, the non-line of sight communication system 46 of the moving platform system 16 makes a connection with the non-line of sight communication system 64 of the ground station system 22. Position information is sent to the computer system 70 of the ground station system 22, and then the predicted position of the antenna 54 is provided to the controller 86 for forming the high speed direct line of sight communication link via the systems 56 and 44. There can be latency period with this information in the range of 3-10 seconds and more typically about 5 seconds. In a preferred embodiment, the positioning information is fed directly from a GPS receiver in the moving platform 18, and provides a time of capture, as well as latitude, longitude, and altitude of the moving platform 18.

The antenna 80 is positioned based on this information, and once the moving platform 18 is within line-of-sight of the antenna 80, an IP connection is preferably achieved. The computer system 42 now switches over to the IP-based broadcast of position information where there is a near-0 second latency period with this information. If this connection fails (due to a variety of events such as the moving platform 18 banking or going beyond the horizon, landing, etc), the computer system 42 will fall back to the non-line of sight communication system 46 to transmit the positioning information.

In use, the pilot navigates the moving platform 18 along the flight path, and the sensor capture system 40 starts capturing sensor data, such as imagery. The sensor capture system 40 saves out the RAW, unprocessed image files directly from the cameras to a specific directory, based on a variety of factors, such as but not limited to the aircraft, sortie, flightplan and flight line. The sensor capture system 40 also produces a position file, shown by way of example and discussed herein as an "XML file" that can be saved along with the RAW file. In one embodiment, this XML file contains:

Image ID—filename of the associated RAW file
Date and Time that the image was captured
Frame Count—sequence number of the image this day
Latitude, Longitude of all four corners of the image The determination with respect to the four corners of the image being determined is one form of "geo-referencing" (although others types of geo-referencing can be used) and can take into account the interior orientation (focal length, principal point and radial distortion of the sensor)—exterior orientation (gps data such as the x, y and z position of the moving platform 18), inertial measurement unit data (such as roll, pitch and yaw), and elevation on the ground of the captured sensor data, and an earth model. In one embodiment, the elevation of the nadir point is determined for each waypoint scheduled during flight planning, and this elevation is used to initially geo-reference the sensor data in lieu of a digital elevation model (the elevation of each image can be taken from the flight plan). In other words, when creating the flight plan—in an embodiment there can be a single elevation captured for each frame of sensor data as an approximation for immediate calculation. Thus, each frame of sensor data is assumed to be at a certain elevation and flat. The elevation for each sensor data can also be accomplished by using lidar data, flash lidar data, or an elevation model, such as the digital elevation model. The client system 12 and/or the computer system 70 of the ground station system 22 can conduct further geo-referencing utilizing a ground elevation model to enhance the geo-referenced accuracy of the sensor data. Further, in a preferred embodiment the sensor data, such as an oblique image, is not ortho-rectified so as to conserve processing power.

The system 10 is provided with "Manager" software packages running on the moving platform system 16, the ground station system 22 and the client system 12. The "Manager" software packages include an "Air Manager" 200 running on the computer system 42 in the moving platform 18, a "Server Manager" 210 on the computer system 70 of the ground station system 22, and "Client Manager" 220 on the display client system 12. In a preferred embodiment, the air manager 200, the server manager 210 and the client manager 220 share a common architecture.

In one embodiment, the managers 200, 210 and 220 include a "backbone" that starts up "nodes" which perform a specific task. The "backbone" also acts like a kind of traffic cop, sending messages from one node to another.

When a node starts up, it tells the backbone a couple things: 1. What kind of node it is; and 2. What data types it wants to subscribe to. While running, a node can also submit status information to the backbone including:

generic status (waiting on input, failed, processing, etc)
node-specific status string ("processing 4/34 images" etc)

Nodes can produce messages of specific types, and can listen for messages of specific types. Messages passed may also include a payload string that usually contains the associated filename. Examples of messages include:

RAW file ready
JPG file ready
XML file ready
URL Announce

In the case of "URL Announce", the payload is the URL. Some nodes will look for multiple files and will announce when both associated files have been found. For example, one portion of the system looks for the RAW imagery, and the associated XML metadata file. When both are found and are complete, then a "RAW+XML" message is sent.

Nodes send messages to their backbone, which then determines what to do with it. The manager will then forward the message to the nodes that have subscribed to those message types. It also can send these messages across an XML-RPC connection to another manager on the same network.

Managers 200, 210 and 220 may also have mechanisms by which they can find each other. For example, a manager 200, 210 and 220 may broadcast information about itself once every second via UDP. This information may include;

XML-RPC port (for inter-manager communications)
Port number for web access
Manager type (air, server, client)
Manager name ("Air Manager", "Server Manager", etc)
Unique id (which may be randomly generated at startup time)

The Unique ID can be used to tell if a manager 200, 210 and/or 220 has been restarted. The managers 200, 210 and 220 may also use this UDP broadcast to determine their own IP information. For example, one of the managers 200, 210 and 220 can start a thread listening for other managers, then start broadcasting, itself. When the broadcasted string matches its own, it knows that it is listening to itself.

In an embodiment, the Managers 200, 210 and 220 can use XML-RPC to forward messages from nodes on one manager to the nodes on the remote manager. Each manager 200, 210 and 220 can also run a logging mechanism which all of the nodes can post messages to. This is so that the users can see the progress of the processing utilizing one or more of the webserver nodes 230, 232 and 234, or if there was a fault, determine what went wrong.

In an embodiment, each manager 200, 210 and/or 220 also loads in an XML-based configuration file at runtime that contains various settings for each node and general settings for the manager 200, 210 and/or 220 itself. When a manager 200, 210 and/or 220 is run, it also looks for a few different configuration filenames in the local directory, which are loaded in after the internal configuration file is consumed.

Managers 200, 210 and/or 220 may also have files integrated into their executable. These are built into the executable at build time. This greatly simplifies distribution of the executable files, since only one file is necessary. This allows for the integrated webserver to provide image files and such without need to install or maintain those files along with the manager executable.

All managers 200, 210 and/or 220 may also be provided with the "WebServer Node" 230, 232 and/or 234. The webserver nodes 230, 232 and/or 234 can be a very simple webserver that acts as the interface to the manager, although sophisticated webservers can also be used. Through the webserver nodes 230, 232 and/or 234, a user can see the status of the manager 200, 210 and/or 220, status of all of the nodes, status of the machine they're running on, the log messages, and the list of URLs that have been announced.

The "Air Manager" (running in the moving platform 18) can be provided with the following nodes:

Dir Scanner Node 240 that in an embodiment looks in a directory of the computer readable medium 48, e.g., a disk, for the RAW images as well as the associated XML files (which can be either geo-referenced or RAW) produced by the sensor capture system 40. The Dir Scanner Node 240 can send out "RAW Ready", "XML Ready" and "XML+RAW Ready" messages, for example.

Developer Node 242—this listens for "RAW Ready", and then grabs the RAW image files, develops the RAW image files preferably using a quick development methodology, such as but not limited to nearest-neighbor debayer, and then saves out sensor data such as in the form of an image file which is shown and described herein by way of example as a "JPEG file." Other file types can be used such as but not limited to BMP; TIFF, and PNG. The developer node 242 can also use either a hardware and/or software based data compression methodology for reducing the size of the developed file. A suitable hardware solution utilizes JPEG 2000 methodology for example. In general, using the system 10 described above, the files are compressed to be in the range of between 3 bits/pixel to 0.0625 bits/pixel. The amount of compression can be dependent upon the speed of the high-speed line of sight communication systems 44 and 56 and with the hardware discussed above, a preferred range of compression is around 12:1 to about 48:1 resulting in an image file having approximately 1 bit/pixel to approximately 0.25 bit/pixel. The developer node 242 also sends out "JPG Ready", "XML+JPG Ready" messages for example.

Pusher Node 244 listens for the "XML+JPG Ready" messages. In an embodiment, the pusher node 244 opens an FTP connection to a ground server 246 hosted by the computer system 70, and pushes a few different file types down to the ground including, but not limited to:

JPEG developed images

XML metadata files

Log files

In one embodiment, the pusher node 244 monitors one or more current directory, and looks at an appropriate directory on the ground server 246 and if there is a file locally (or there is a local file with a different file size), the pusher node 244 will push that file down to the ground server 246.

Radio Node 248—this is a special node that talks with the line of sight communication controller 52 for sending data between the moving platform 18 and the ground. The radio node 248 monitors transmission quality, and other radio-based statistics.

The Ground/Server Manager 210 (running on the computer system 70 of the ground station system 22 can have the following nodes:

Dir Scanner node 250 looks on the one or more computer readable medium 74, e.g., disk or memory, for the JPG images as well as the associated XML files pushed down via the pusher node 244 in the moving platform 18. The DirScanner node 250 can send out "JPG Ready", "XML Ready" and "XML+JPG Ready" messages, for example.

Slicer Node 252 listens for "JPG Ready" messages. It loads in the JPEG files, scales and slices them for a map visualization computer program, such as Google Earth. In this instance, the slicer node 252 creates "superoverlays" (a means to overlay large volumes of data in an efficient manner) tailored to the specifications for Google Earth. The slicer node 252 sends out "JPGS Ready" and "XML+JPGS Ready" messages, for example.

KML Gen node 254 can read in the XML files, and generate one or more KML file that can be used with the associated JPEG file to load the imagery into Google Earth, for example. The KML Gen node 254 also generates the static KML Pyramids (which is a means to store multiple levels of resolution so that lower resolution versions of the image can be shown, saving on memory and bandwidth, when the user viewpoint is far away from the image being displayed) used for the "Superoverlay" method of loading imagery into Google Earth.

Radio Node 256 is similar to the radio node 248 discussed above.

An exemplary Client Manager 220 (running at the ground station) may have, but is not limited to the following nodes:

Dir Scanner Node 260 looks for sliced images produced on the ground server manager 210, as well as their associated XML files. The Dir Scanner Node 260 sends out "XML+JPGS" messages.

Launcher Node 262—Looks for "XML+JPGS" messages and when the launcher node 262 sees these, that information is added to a "launch queue". The launcher Node 262 includes the following two main parts.

1. The launch queue. When "XML+JPGS" messages are consumed, the associated information is added to the end of a launch queue. The launcher mechanism will call a map visualization software program, such as Google Earth, with the URL to a KML file for this data. This is a url for the secondary webserver, with a specifically crafted URL which describes to the webserver exactly which source XML file to use, as well as where exactly in the superoverlay/pyramid the data is.

2. Secondary webserver—this generates a "URL Announce" message resulting in the URL to this webserver appearing on the web interface in the "Web server node". On demand, this webserver may produce the KML pyramid files needed for a KML Superoverlay. These are preferably generated live, rather than being static, because they need to include the IP address of the machine which they are running on, and the address for this webserver, as well as a tertiary webserver that provides image data, if the node is configured as such. This webserver also provides a browsing interface to all of the aquired data thus far. The user will see thumbnails of the individual images, sorted by flight plan and sortie. The user can also trigger entire flight plans to be launched from this interface.

The tertiary webserver, usually IIS, to provide the image data, since it is more finely tuned to providing mass amounts of static data.

In use, the Air Manager's node 240 scans for RAW and XML files generated by the sensor capture system 40. Once found, this triggers the developer node 242 to convert the RAW file to a JPEG file. These files are then pushed to the ground server node 246 over the wireless network connection, preferably via the FTP protocol.

It should be noted that the sensor capture system 40 and the air manager 200 are preferably decoupled to work independently and this is an advantage to having the sensor capture system 40 saving files into a particular directory and then having the dirscanner node 240 monitoring the directory for new files. This can be represented as a distinct break between the sensor capture system 40 and the Air Manager 200 so that the two systems function independently so that the sensor capture system 40 cannot directly affect the operation of the air manager 200 and vice-versa.

The Ground server node 246 watches the incoming FTP directories for the above pushed XML and JPG files. It then will initiate the generation of the static KML files, and slice up and scale the JPEG file, for example.

The dir scanner node 260 watches the directory (preferably mounted via a Smb network share) for the above sliced JPEG and XML files. Once it sees them, they are added to the launcher's queue. The launcher will then launch the map visualization computer program, such as "Google Earth" using any suitable technology, such as via a URL. The map visualization computer program, such as but not limited to Google Earth, will query the launcher's webserver, and IIS (if configured as such) to retrieve the KML and image pyramids needed.

It should be noted that KML+JPEG are for the current implementation of the system. That is to say, the current display client application (or map visualization computer program) is Google Earth. Google Earth allows for KML and JPEG files as one of its source media types. In the diagram and in the image lifecycle, we could just as easily be generating other image formats or other metadata formats, or possibly combining them into one binary file along the way, to suit the needs of other display clients, other visualization software packages, or in a package format determined by the needs of the end customer.

It should be noted that there are two places in the system where KML files are generated. What follows is a brief explanation of the differences between them. KML files specify the image file that's associated to them via a filepath or network link URL. They also specify the sub-KML files in similar ways with respect to KML Superoverlay pyramids. The first way is a direct path on a local filesystem. This would be something like "groundImagery.jpg". The second way is via a weblink URL, e.g., http://192.168.1.42/Imagery/This-Flight/groundImagery.jpg".

In this case, it would require that a webserver be running on the computer with a network address of "192.168.1.42" which can provide the image file.

The KML Gen node generates files of the former type. These KML files are to be used in combination with an image file or files, and can be distributed to whomever, and loaded without any knowledge of the above system. They're just static KML and JPG files. In an embodiment, the Launcher node 262 generates files of the latter type. It also generates them live, as needed. This is done because the image pyramids (superoverlays) function better in Google Earth when they refer to KML and imagery provided via a webserver, rather than as local files. In order to accommodate the possibility that the Client Server software might be running on one or more machines, or might be running on a completely different network, we need to generate the address of the provider in the links in the KML files as they are needed. This allows for even that machine to change its address and everything still works.

The total latency from the image being acquired through the sensor capture system 40 to it launching in Google Earth is roughly 20 seconds. Most of that time is the directory scanners making sure that they have complete data files. Further, although FIG. 12 illustrates push technology being utilized to push the sensor data and the positional data to the data server 246, it should be understood that pull technology could also be used. For example, the data server 246 can be configured to poll the pusher node 244 to initiate the transmission of the sensor data and the positional data.

FIG. 13 is an exemplary XML file containing position data in accordance with certain versions of the presently disclosed and claimed inventive concepts. In particular, the XML file contains information regarding the geo-referencing of the sensor date such as but not limited to the lat/long coordinates for four corners of the sensor data, as well as various location regarding the capturing of the sensor date, such as the location of the RAW file, mission ID, date/time of capture, framecount and the like.

Figure 14:
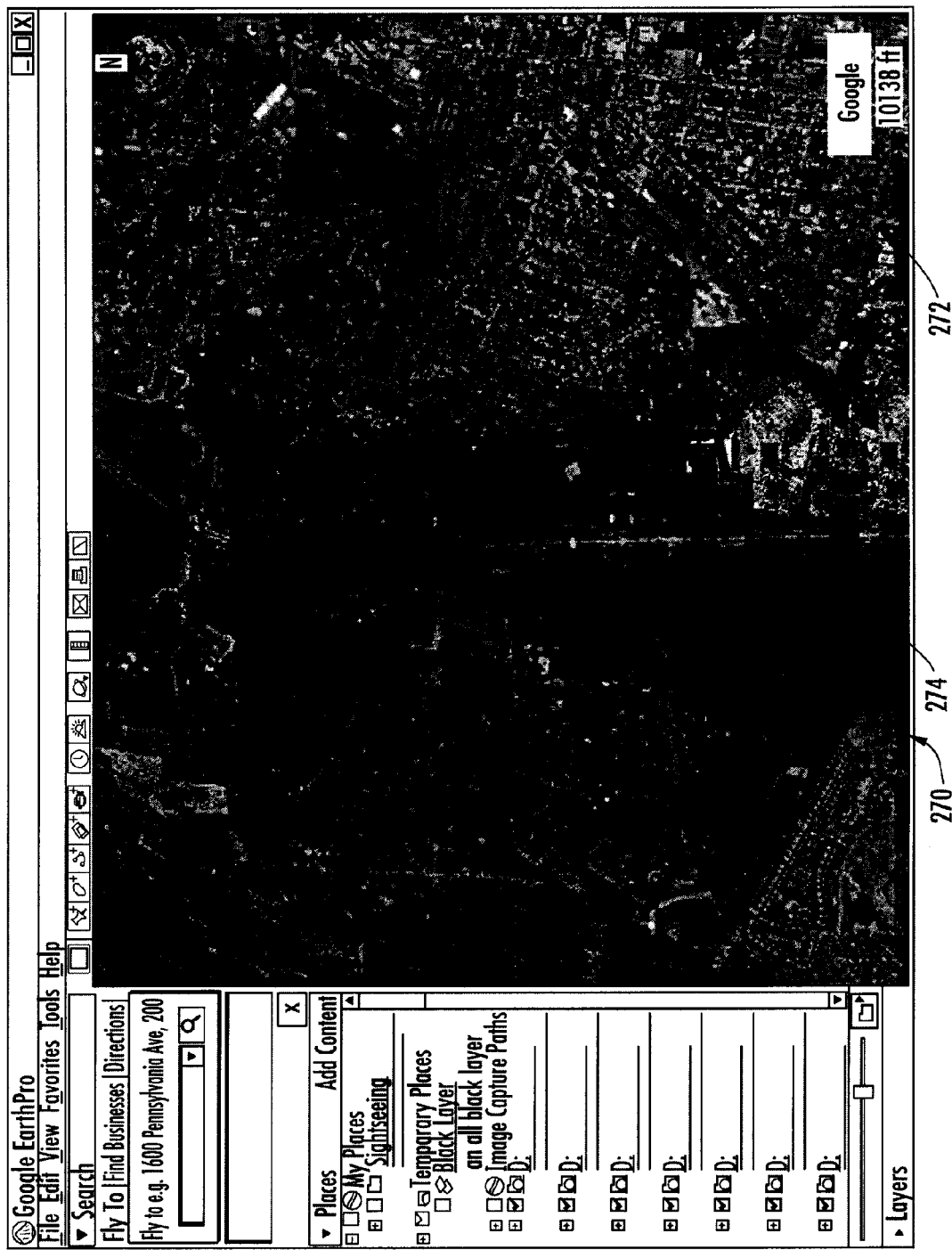
FIG. 14 is a diagrammatic view of a screen of one of the client systems illustrating the automatic rendering of data products (for example, oblique images) in real time onto a geospatial map of a map visualization computer program indicative of the area covered by newly created data products in accordance with certain versions of the presently disclosed and claimed inventive concepts.

FIG. 14 is a diagrammatic view of a screen 270 of one of the client systems 12 illustrating the automatic rendering of data products (for example, oblique images) in real time onto a geospatial map 272 of a map visualization computer program indicative of an area 274 covered by newly created data products in accordance with certain versions of the presently disclosed and claimed inventive concepts.

Figure 15:
FIG. 15 is a diagrammatic view of the screen of one of the client systems illustrating the rendering of an ortho image onto the geospatial map of a map visualization computer program in accordance with certain versions of the presently disclosed and claimed inventive concepts.

FIG. 15 is a diagrammatic view of the screen 270 of one of the client systems 12 illustrating the rendering of an ortho image 276 onto the geospatial map 272 of the map visualization computer program in accordance with certain versions of the presently disclosed and claimed inventive concepts.

Figure 16:
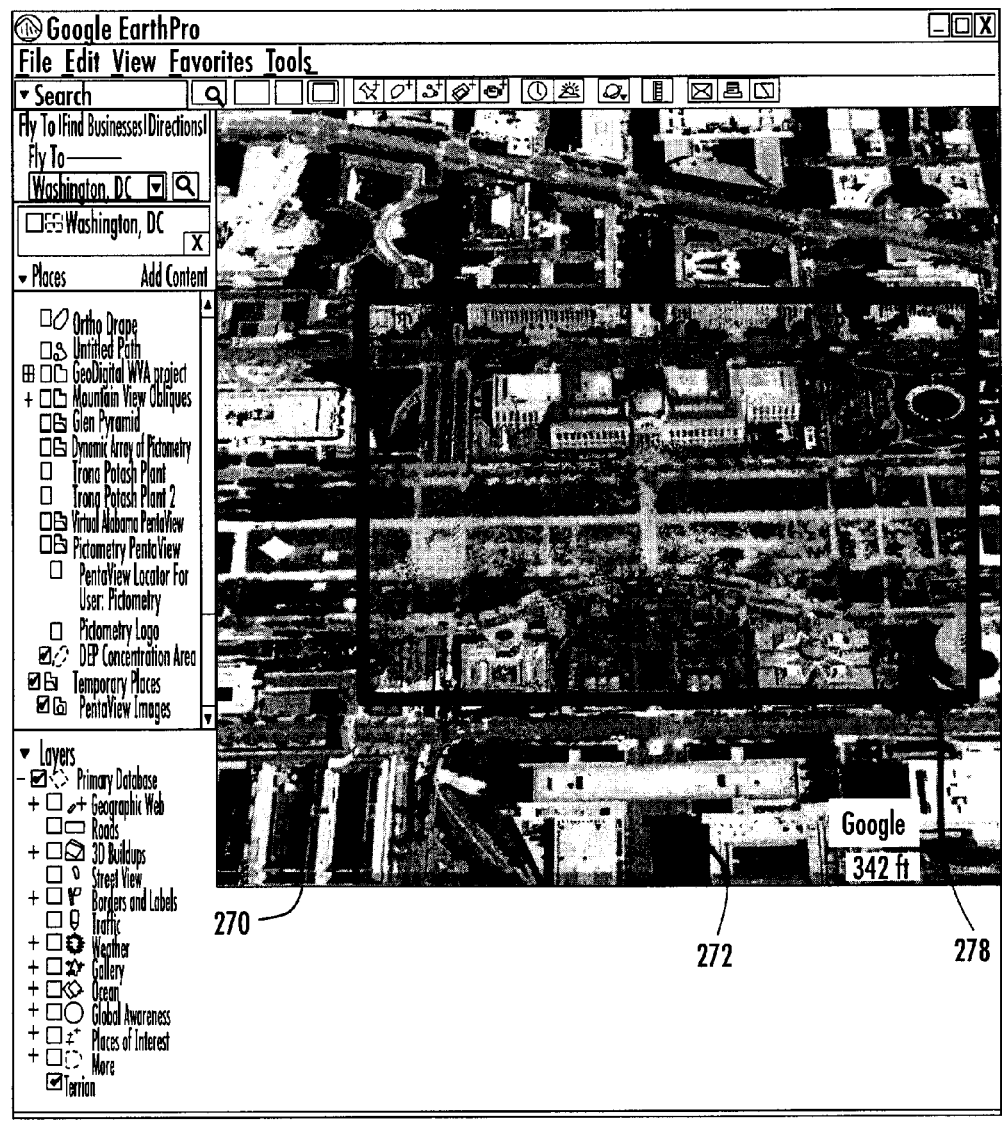
FIG. 16 is a diagrammatic view of the screen of one of the client systems illustrating the rendering of an oblique image onto the geospatial map of a map visualization computer program in accordance with certain versions of the presently disclosed and claimed inventive concepts.
Figure 17:
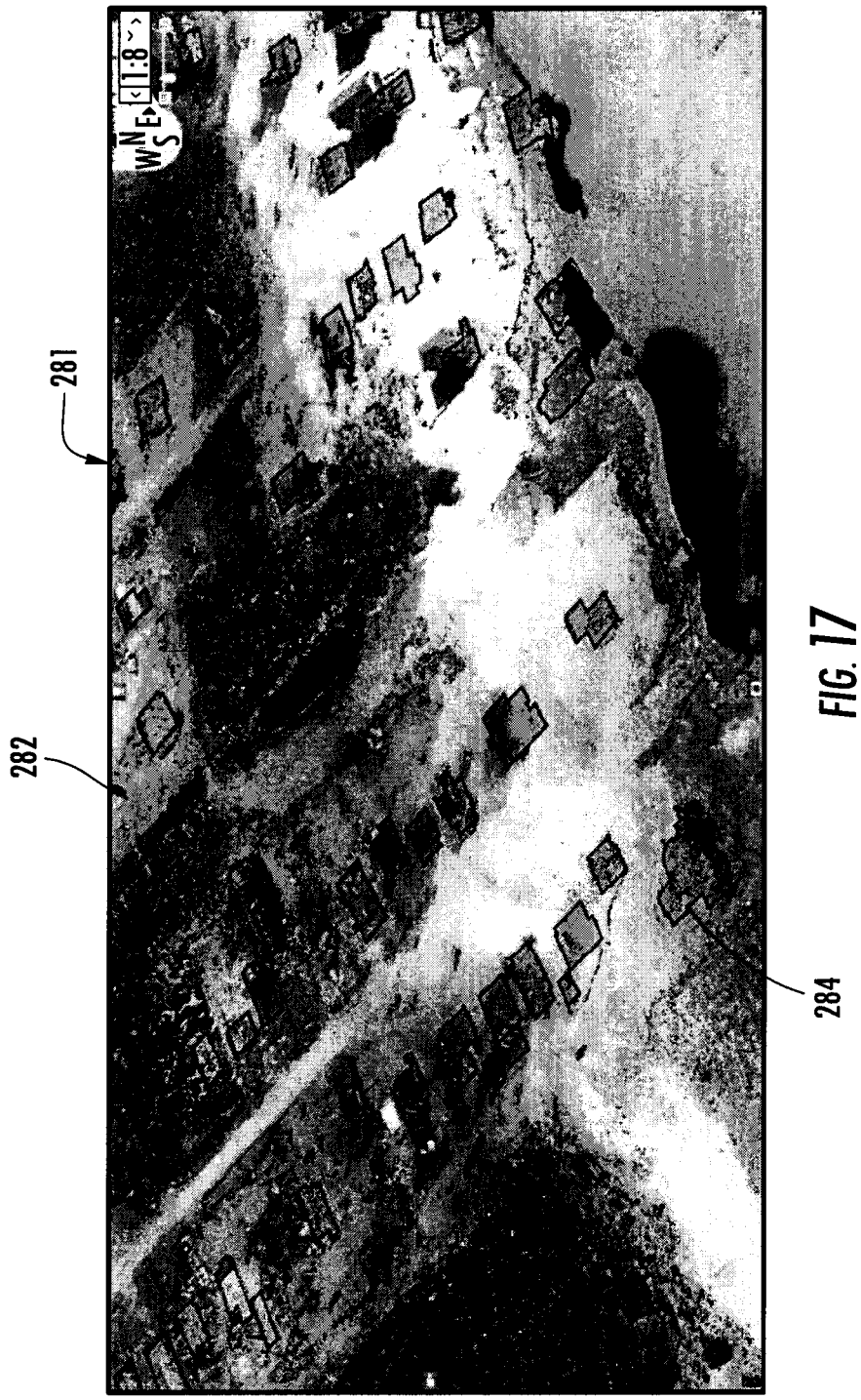
FIG. 17 is a diagrammatic view of a data product produced by the real-time moving platform management system in accordance with certain versions of the presently disclosed and claimed inventive concepts.
Figure 18:
FIG. 18 is a diagrammatic view of the screen of one of the client systems illustrating at least a portion of oblique image pixel content positioned to appear on or above the geospatial map and aligned relative to the optical axis of a sensor that captured the oblique image.
Figure 19:
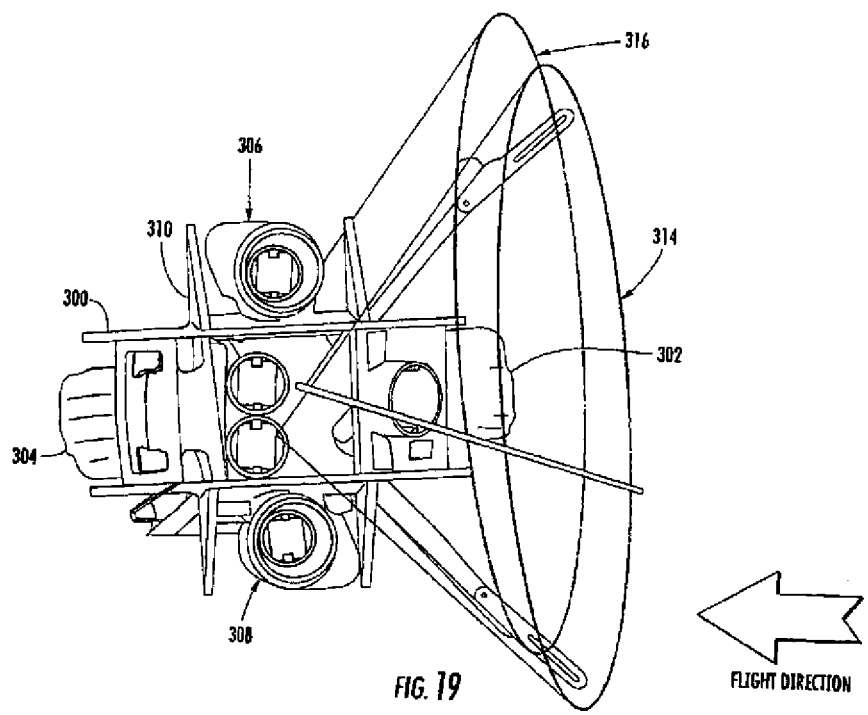

Referring now to FIGS. 16-18, in general, there are two primary ways to render or display oblique images on the geospatial map 272: by stretching the oblique images to fill the area they cover on the ground or by standing them up perpendicular to the optical axis of the sensor that captured them. The first method is pretty straight forward. A determination is made where the image content maps to on the ground and then pixels are stretched to fill that space. This can be done by calculating the location of the four corners of the oblique image and applying a linear stretch to the pixel data between the corners of the oblique image or by taking the exterior camera geometry into account and projecting each portion of the oblique image down to its proper location on the ground. One way to visualize this method is take a projector, load it with the captured oblique image, and place the projector at the same location and orientation that the sensor was in when it originally captured the image. The captured image would be projected down to the ground and fill all of the ground originally captured by the sensor. For oblique images from a view perpendicular to the ground, the resulting projection on the ground would take on a trapezoidal shape deformed by any yaw, pitch, or roll of the moving platform and potentially by any changes in terrain if those changes are accounted for in the mapping model used by the mapping software.

An example of the rendered oblique image 278 on the geo-spatial map 272 is shown in FIG. 16 as a diagrammatic view of the screen 270 of one of the client systems 12. In particular, FIG. 16 illustrates the rendering of the oblique image 278 onto the geospatial map 272 of a map visualization computer program in accordance with certain versions of the presently disclosed and claimed inventive concepts.

For the second method, as shown in FIG. 18, this is a little trickier. The object is to maintain the rectangular form of the oblique image 278 (shown in FIG. 18 as being surrounded by dashed lines) and not warp it at all, but to place it within the geospatial map 272 such that when viewed from the same location and orientation of the camera that captured the oblique image 278, it is indistinguishable in appearance from the first method since it lines up with the area on the ground. To maintain the image's rectangular form, the image 278 can be placed on a mathematical plane 280 that is perpendicular to the optical axis that captured it. It need not be perfectly perpendicular (for example, even +/−5-degrees off perpendicular can work if the image is not warped beyond desirable amounts) but should be close enough to avoid any undesirable warping.

Next, in order to fill the scene as best as possible, the image 278 needs to be as close to the ground as possible. Since the optical axis intersects the ground obliquely, this means the oblique image 278 is not laid flat on the ground but instead is rendered as standing up above the ground on the mathematical plane 280a so that at least a portion of the oblique image pixel content is shown as being above the ground. In order to keep as much of the oblique image 278 visible as possible, this generally means a bottom edge 282 of the oblique image 278 is placed along the surface of the ground in the geospatial map. The mathematical plane 280a on which the oblique image 278 is rendered then projects up from the ground intersecting the optical axis in a generally perpendicular manner as discussed above.

The edges of this mathematical plane 280a are then described by the field of view of the sensor that captured the image. Thus, if the camera has a 20-degree horizontal field of view then the right size of the mathematical plane would end along a vertical edge that is projected outward from the optical axis by 10-degrees starting at the location from which the image was originally captured. One way to visualize this method is to make a billboard that is as wide as the ground area depicted in the bottom of the oblique image and whose height is then constrained to meet the aspect ratio of the sensor. Thus, if you are using a sensor with a 3:2 aspect ratio and the front of the image covers an area on the ground 1,500-feet wide, the billboard would be 1,000-feet tall. The oblique image is then printed on this billboard preferably without warping or stretching—it is merely scaled to fit the billboard. Finally, this billboard is then placed on the surface of the earth lining the front of the image with the same location it covers on the ground and then tilting the billboard up so that it is perpendicular to the optical axis—that is, until you are looking straight at it when looking from the location and orientation at which the oblique image was originally captured.

Because in one embodiment the sensor capture system 40 captures each ground location from multiple directions, the result is typically four of these oblique views, or billboards, standing up with one from each direction captured. However, the map visualization computer program may hide one or more views that are pointed away from the current viewpoint so that only two or three of the four oblique views (north, south, east, and west) are visible at any one time. However, in this event, the map visualization computer program can be adapted to reveal the other directional views by rotating the viewpoint of the geospatial map 272. In the example shown in FIG. 18, three of the mathematical planes 280a, 280b and 280c are shown with oblique images rendered upon the mathematical planes 280a, 280b and 280c. The mathematical planes 280a, 280b and 280c correspond to North, West and East views standing up in their proper location.

FIG. 17 is a diagrammatic view of a data product 281 produced by the real-time moving platform management system 10 in accordance with certain versions of the presently disclosed and claimed inventive concepts. In particular, because the data product 281 includes a geo-referenced oblique image 282, a GIS layer 284 (shown in solid lines) illustrating the original locations of building footprints can be overlaid on the geo-referenced oblique image 282.

Figure 19:
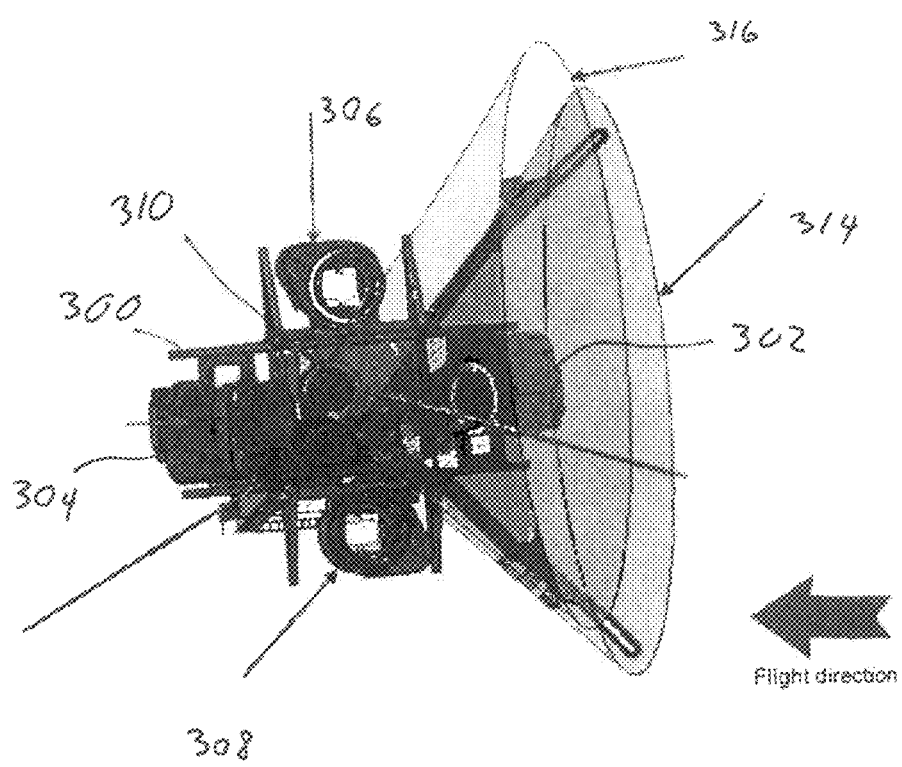
FIG. 19 is a bottom perspective view of an alternate configuration of sensors usable by the image capture system for capturing sensor data including one or more supporting structure supporting forward and aft oblique color cameras, a nadir color camera and a nadir IR camera, a flash LADAR sensor (laser and camera) (preferably pointing in a nadir direction), and a motion video camera (e.g., 30 frames per second).
Figure 3:
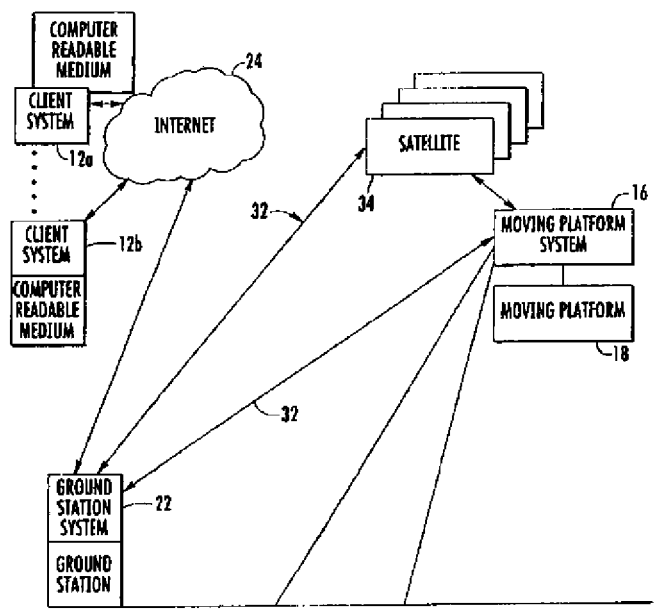
Figure 4:
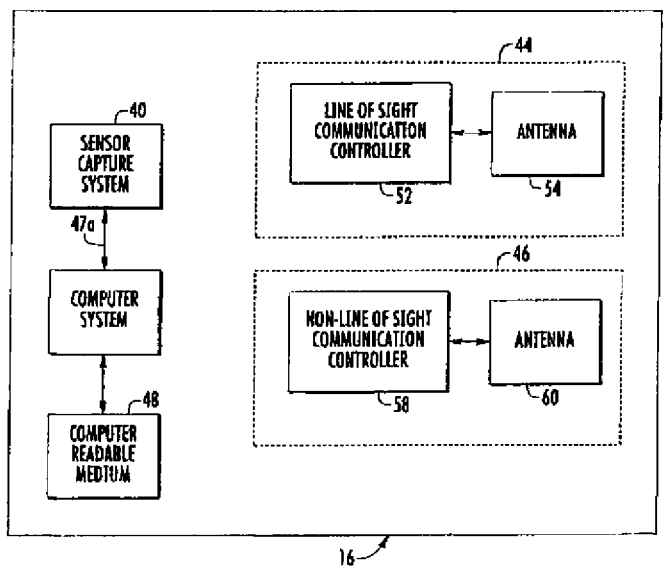
Figure 5:
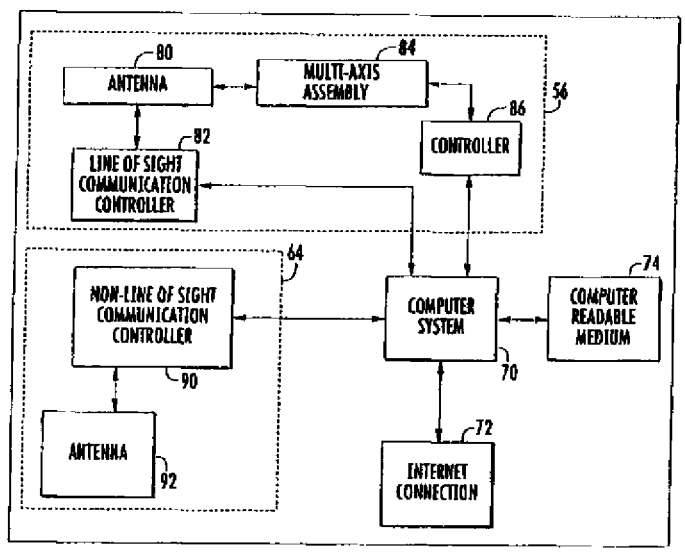
Figure 6:
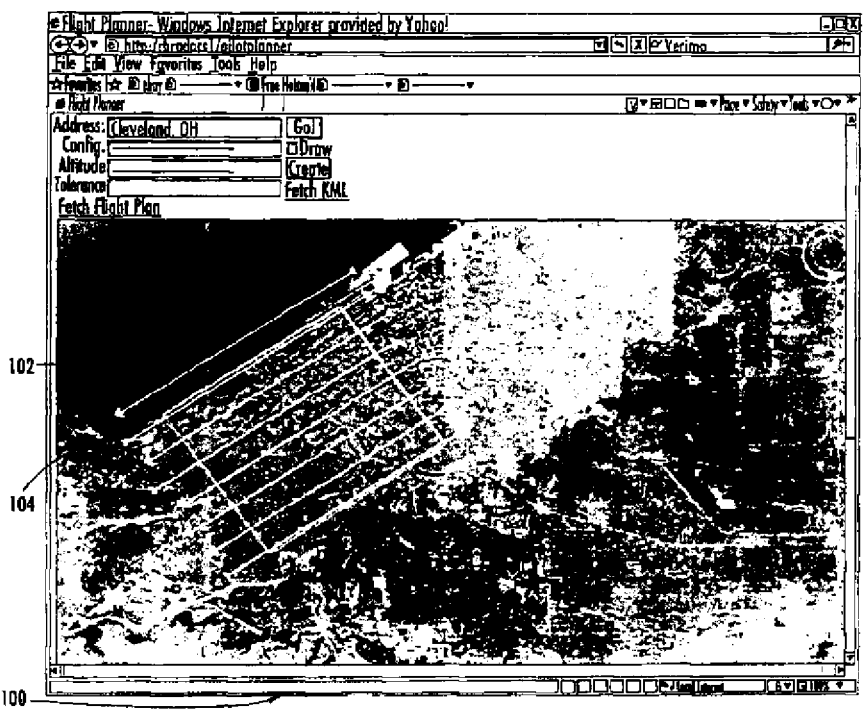
Figure 6A:
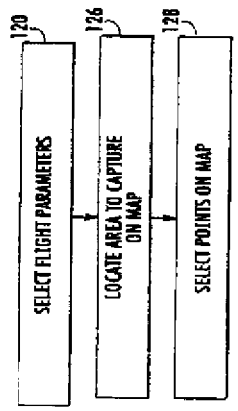
Figure 6B:
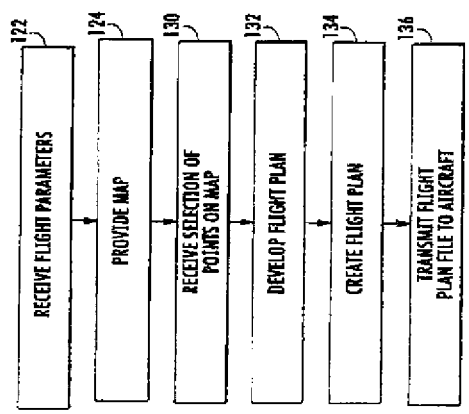
Figure 7:
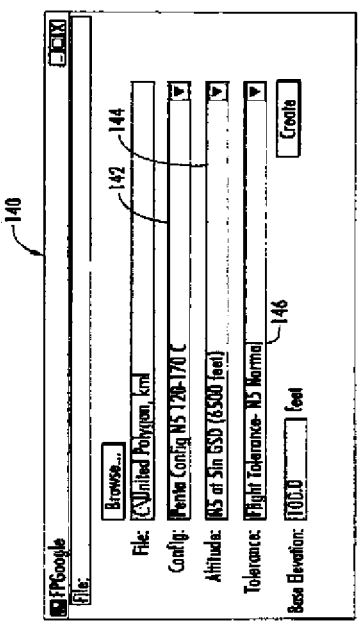
Figure 8A:
Figure 8B:
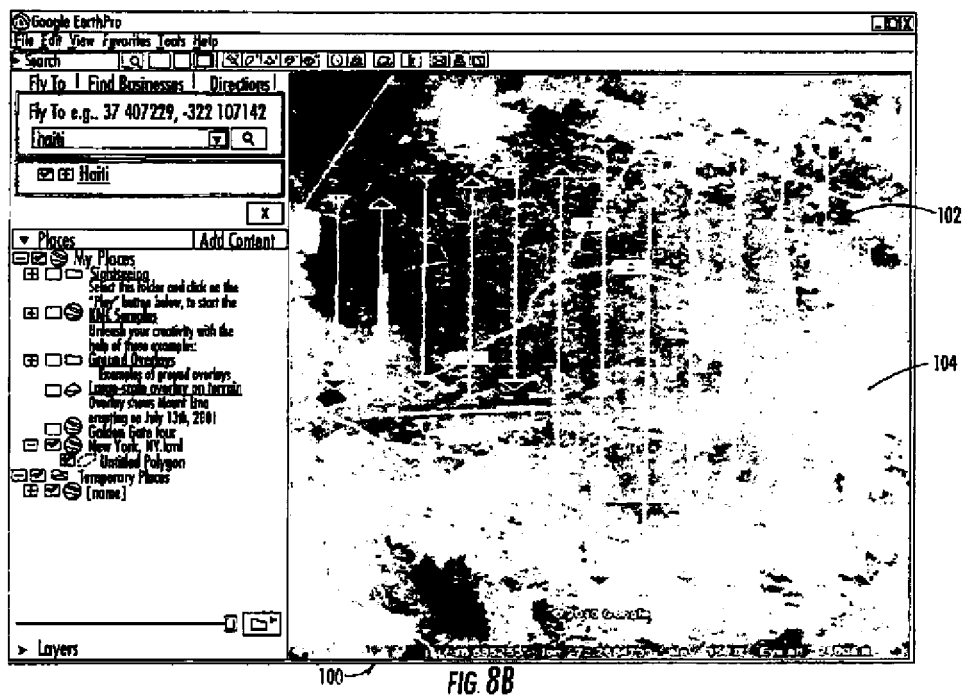
Figure 9:
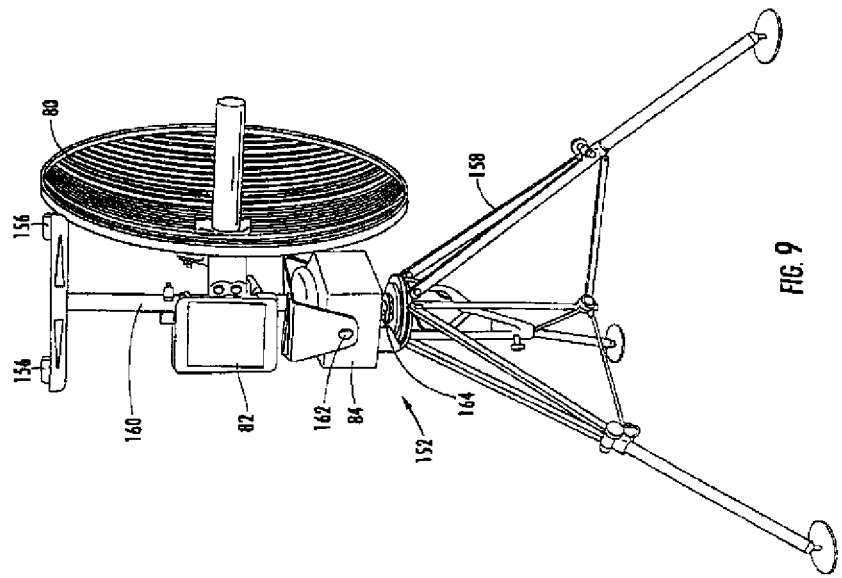
Figure 15:
Figure 16:
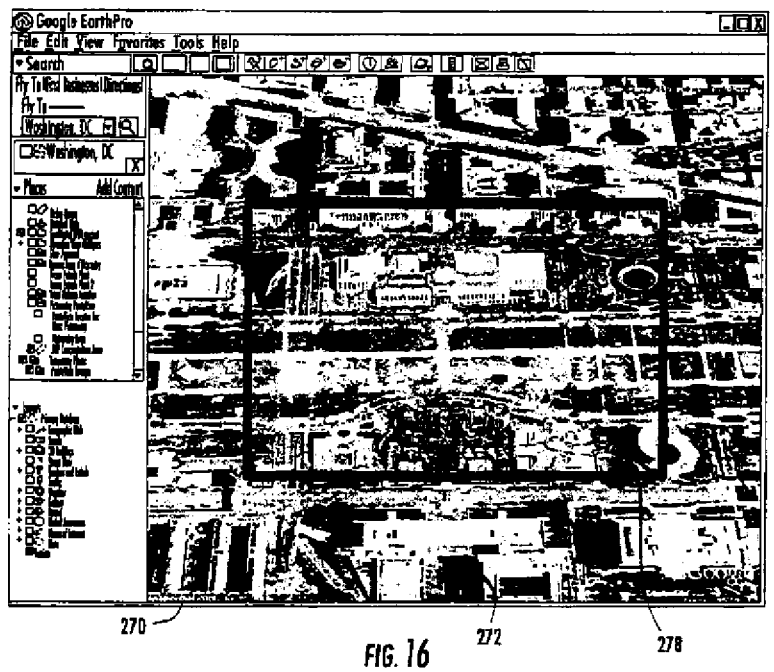
Figure 17:
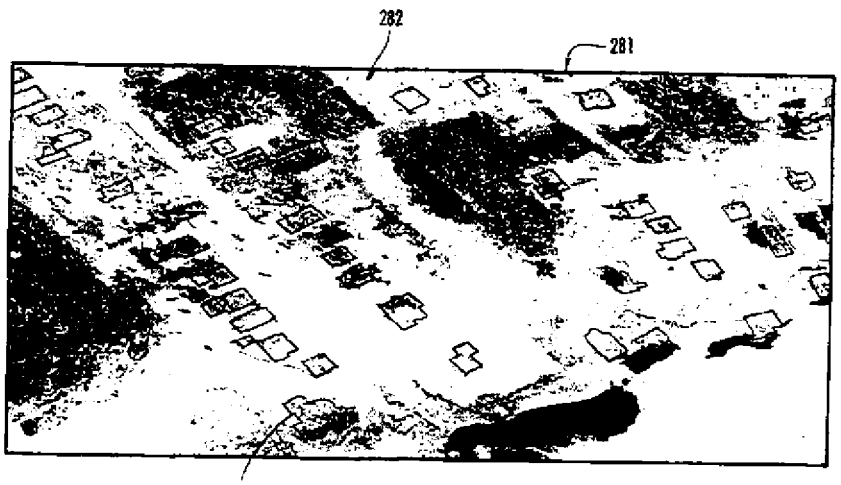

FIG. 19 depicts an alternate configuration of sensors usable by the sensor capture system 40 for capturing sensor data including one or more supporting structure 300 supporting forward and aft oblique color cameras 302 and 304, a nadir color camera 306 and a nadir IR camera 308, a flash LADAR sensor (laser and camera) 310 (preferably pointing in a nadir direction), and a motion video camera 312 (e.g., 30 frames per second).

A major need during the aftermath of a major disaster is the determination of the amount of debris that must be cleared. This volumetric information is important in order to have the correct number of trucks on hand to haul away the debris. If the amount of debris is underestimated, then the debris removal takes longer than desired. If the amount of debris is overestimated, then the cost for debris removal runs over budget.

One manner to solve this problem is to capture new surface elevation data immediately following the disaster and calculate the volume of any debris volumes by taking the difference between the original ground surface data and the newly captured surface elevation data. In order to properly monitor the removal of the debris, this calculation must occur quickly and cannot wait the days, weeks, or months that normal elevation model generation takes. Getting this information in real-time or near real-time is extremely beneficial.

In addition, there will be many times the system 10 is used in areas with poor elevation data or even no elevation data. In order to make more accurate measurements, it may be desirable to gather new elevation data at the same time the oblique imagery is being captured. This elevation data can then be used to geo-reference the oblique imagery. Since the goal of this system is to provide fully geo-referenced oblique imagery in real-time, the elevation data should be captured in real-time when poor or even no elevation data exists.

In one configuration of the preferred embodiment system 10, this is accomplished by incorporating a Flash LADAR system from Ball Aerospace. The Flash LADAR system emits a burst of laser energy in a dispersed beam 314 which reflects off the surface of the earth (as well as any objects or structures on or above the surface of the earth) and then a sensor records the wave form of the returning light 316 including the highly precise time elapsed from the time the laser was pulsed to the time the light returns to the camera. By using this elapsed time information, the distance from the sensor to the ground can be calculated for each discreet sensor element seen by the Flash LADAR system's camera.

While the preferred embodiment system uses a Flash LADAR system, any system capable of capturing remotely sensed elevation data can be used, such as a pulsed LiDAR system, a Geiger Mode LiDAR system, a Synthetic Aperture Radar system, or even an automatically generated aerial-triangulation extracted surface model directly from oblique or nadir imagery captured in real-time.

In a preferred embodiment, the steps of the processes described herein occur sequentially in real-time. The actual time periods in at least one of the preferred embodiments may depend upon the speed of the equipment used to carry out the stated and claimed inventive concepts as well as any delay times that is not necessitated by the equipment. For example, the speed and/or the efficiency of the communication systems and the computer systems may have an effect on the execution time of the methods described herein. As such, the term "real-time" is meant to designate a temporal relationship relating to the timing of the steps described herein.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The term "computer readable medium" as used herein refers to an article capable of storing computer readable instructions (e.g., software or firmware) in a manner accessible and readable by one or more computer systems. Examples of computer readable mediums include memory, a hard disk, a floppy disk, a flash drive or the like.

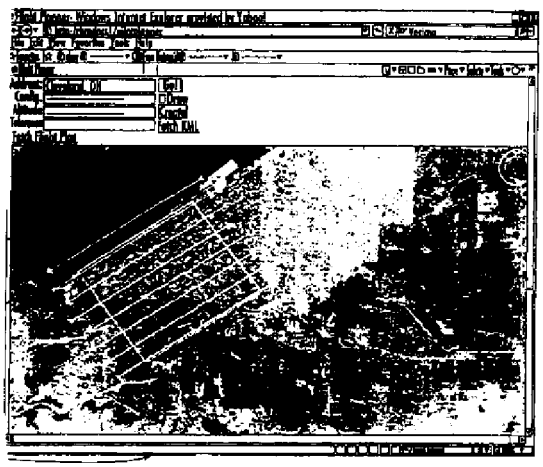

What is claimed is:

1. A system for communicating data between a moving platform system and a ground station system in real-time, comprising:
- a moving platform system suitable for mounting and use on a moving platform, the moving platform system comprising:
  - a position system monitoring a location of the moving platform and generating a sequence of time-based position data;
  - a first non-line of sight communication system;
  - a first high-speed directional line of sight communication system;
  - a computer system monitoring an availability of the first non-line of sight communication system and the first high-speed directional line of sight communication system and initiating connections when the first non-line of sight communication system and the first high-speed directional line of sight communication system are available, and receiving the sequence of time-based position data and transmitting the sequence of time-based position data via at least one of a currently available first non-line of sight communication system and first high-speed directional line of sight communication system;
- a ground station system comprising:
  - a second non-line of sight communication system adapted to communicate with the first non-line of sight communication system of the moving platform system;
  - a second high-speed directional line of sight communication system adapted to communicate with the first high-speed directional line of sight communication system of the moving platform system; and
  - a computer system adapted to monitor the location and altitude of the moving platform by receiving the sequence of time-based position data from at least one of the second non-line of sight communication system and the second high-speed directional line of sight communication system of the ground station system, filtering the input from the second non-line of sight communication system and the second high-speed directional line of sight communication system of the ground station system to properly time-sequence at least a portion of the position data to generate a predicted position of the moving platform; and
  - a tracking device comprising:
    - a multi-axis assembly connected to the second high-speed directional line of sight communication system; and
    - one or more controller receiving the predicted position of the moving platform, and controlling the multi-axis assembly to aim the second high-speed directional line of sight communication system of the ground station system to communicate with the first high-speed directional line of sight communication system of the moving platform system.

2. The system of claim 1, wherein the system is adapted to function in real-time.

* * * * *

UNITED STATES PATENT AND TRADEMARK OFFICE
CERTIFICATE OF CORRECTION

PATENT NO. : 8,477,190 B2  Page 1 of 11
APPLICATION NO. : 12/831971
DATED : July 2, 2013
INVENTOR(S) : Frank D. Giuffrida et al.

It is certified that error appears in the above-identified patent and that said Letters Patent is hereby corrected as shown below:

The title page should be deleted and substitute therefor the attached title page In the Drawings Replacement Drawings for Figs. 1-19:

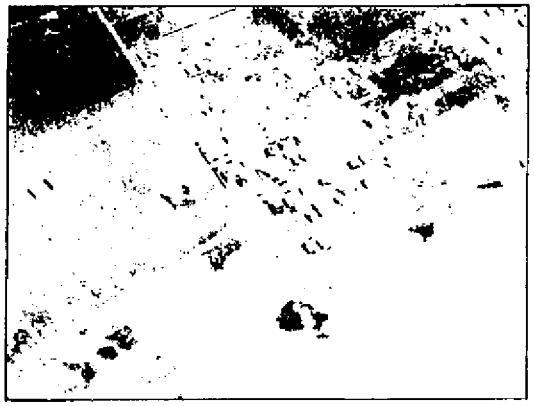

FIG. 1

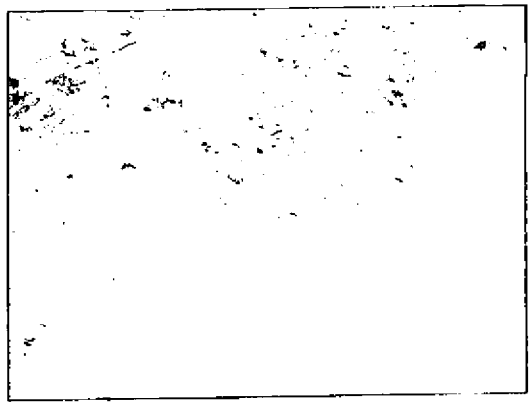

FIG. 2

Signed and Sealed this
Seventh Day of January, 2014

Margaret A. Focarino
*Commissioner for Patents of the United States Patent and Trademark Office*

| EVENTS AS THEY OCCUR | LINK IN USE | WHEN THEY ARRIVE | | WHAT IS SENT THROUGH |
|---|---|---|---|---|
| | | On HS | On LS | |
| 1001 | HS | 1001 | | 1001 |
| 1002 | HS | 1002 | | 1002 |
| 1003 | HS | 1003 | | 1003 |
| 1004 | HS | | | |
| 1005 | None (HS interrupted) | | | |
| 1006 | None (LS initiated) | | | |
| 1007 | LS | | | |
| 1008 | LS | | | |
| 1009 | LS | | | |
| 1010 | LS | | | |
| 1011 | LS | | 1007 | 1007 |
| 1012 | LS | | 1008 | 1008 |
| 1013 | LS (HS reinitiated) | | 1009 | 1009 |
| 1014 | LS/HS | 1013 | 1010 | 1013 |
| 1015 | LS/HS | 1014 | 1011 | 1014 |
| 1016 | LS/HS | 1015 | 1012 | 1015 |
| 1017 | HS (LS terminated) | 1016 | | 1016 |
| 1018 | HS | 1017 | | 1017 |
| 1019 | HS | 1018 | | 1018 |
| 1020 | HS | 1019 | | 1019 |
FIG. 10
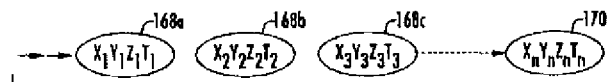
FIG. 11
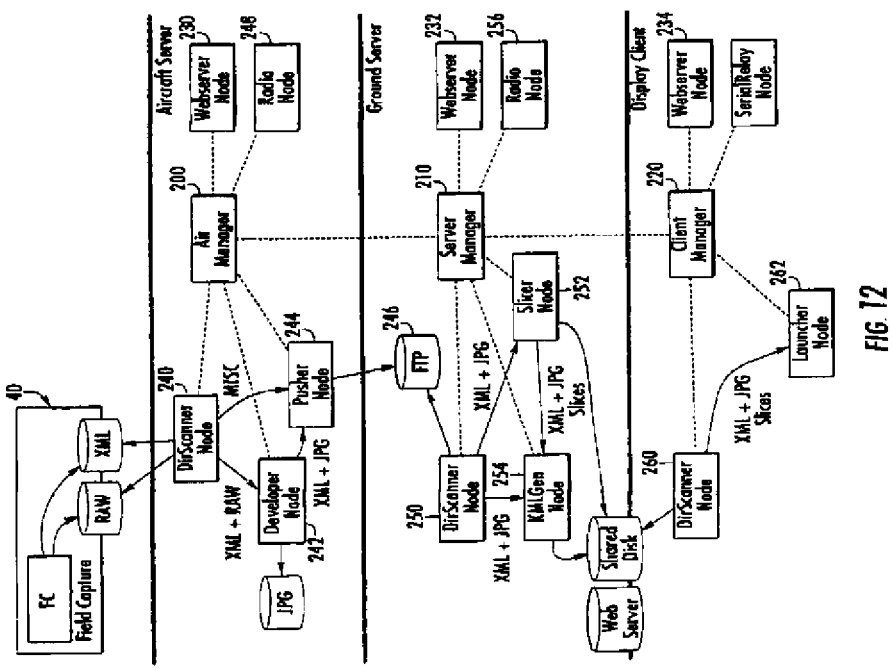
FIG. 12

```
<?xml version="1.0" encoding="UTF-8"?>
<imageNotification
ImageID="D:\Pictometry\ShotData\21Y_C_090708\WVBERK_TS908_21Y_475C_090708\WV
BERK028055NeighOrtho4945_090708.RAW" special="false">
<missionID> Pictometry-Test</missionID>
<layer>VIS</layer>
<dateTime>2009-07-08T18:04:03.250-05:00</dateTime>
<frameCount>000000632</frameCount>
<corners>
<topLeft lat=" 0.688717" lon=" -1.361167"/>
<topRight lat=" 0.688697" lon=" -1.361165"/>
<botRight lat=" 0.688694" lon=" -1.361202"/>
<botLeft lat=" 0.688714" lon=" -1.361205"/>
</corners>
<rowNum>1</rowNum>
<colNum>1</colNum>
</imageNotification>
```

FIG. 13

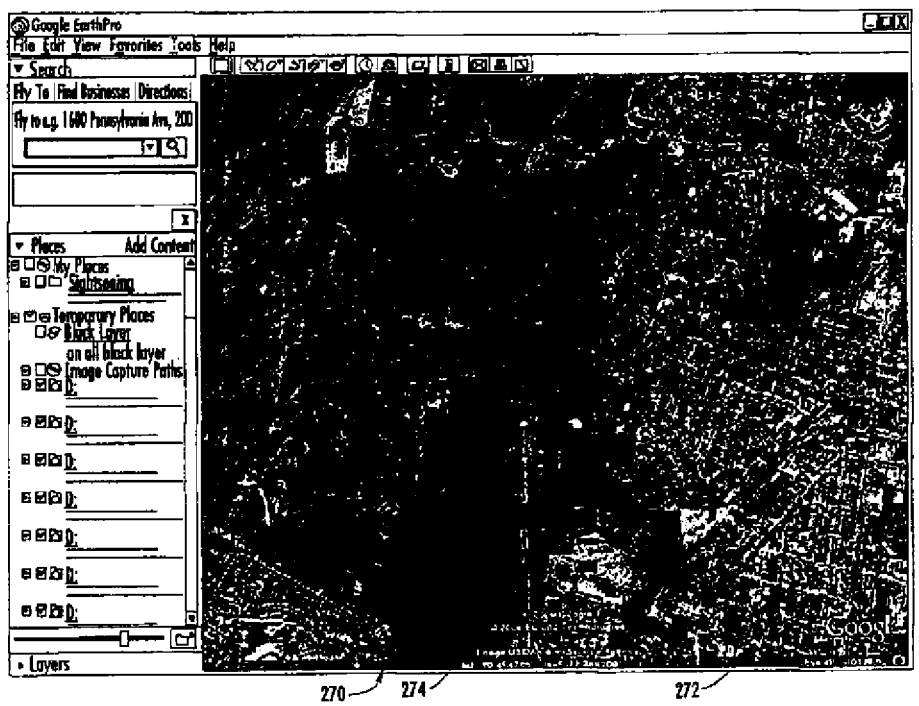

FIG. 14

(12) United States Patent
Giuffrida et al.

(10) Patent No.: US 8,477,190 B2
(45) Date of Patent: Jul. 2, 2013

(54) REAL-TIME MOVING PLATFORM MANAGEMENT SYSTEM

(75) Inventors: Frank D Giuffrida, Honeoye Falls, NY (US); Mark A. Winkelbauer, Rochester, NY (US); Charles Mondello, Pittsford, NY (US); Robert S. Bradacs, Rochester, NY (US); Craig D. Woodward, Rochester, NY (US); Stephen L. Schultz, West Henrietta, NY (US); Scott D. Lawrence, Pittsford, NY (US); Matt Kusak, Rochester, NY (US); Kevin G. Willard, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 427 days.

(21) Appl. No.: 12/831,971

(22) Filed: Jul. 7, 2010

(65) Prior Publication Data
US 2012/0007982 A1   Jan. 12, 2012

(51) Int. Cl.
| H04N 7/18 | (2006.01) |
| H04N 3/28 | (2006.01) |
| H04N 7/00 | (2006.01) |
| H04B 7/208 | (2006.01) |
| H04L 12/66 | (2006.01) |
| H04L 12/56 | (2006.01) |
| H04J 3/08 | (2006.01) |
| H04W 4/00 | (2009.01) |

(52) U.S. Cl.
USPC ......... 348/144; 348/116; 348/143; 348/159; 348/206; 455/427; 455/429; 455/430; 455/431; 370/337; 370/344; 370/352; 370/428; 370/503

(58) Field of Classification Search
USPC ......... 348/116, 143, 144, 159, 206; 370/337, 370/344, 352, 428, 503; 455/427, 429–431
See application file for complete search history.

(56) References Cited

U.S. PATENT DOCUMENTS
| 2,273,876 A | 2/1942 | Lutz et al. |
| 3,153,784 A | 10/1964 | Petrides et al. |

(Continued)

FOREIGN PATENT DOCUMENTS
| AT | 331204 T | 7/2006 |
| AU | 9783798 | 4/1999 |

(Continued)

OTHER PUBLICATIONS

Ackermann, Prospects of Kinematic GPS Aerial Triangulation, ITC Journal, 1992.

(Continued)

*Primary Examiner* — David Lazaro
*Assistant Examiner* — Farzana Huq
(74) *Attorney, Agent, or Firm* — Dunlap Codding, P.C.

(57) ABSTRACT

A moving platform system suitable for mounting and use on a moving platform, comprising a position system monitoring the location of the moving platform and generating a sequence of time-based position data, a non-line of sight communication system, a high-speed line of sight communication system, and a computer system monitoring the availability of the non-line of sight communication system and the high-speed line of sight communication system and initiating connections when the non-line of sight communication system and the high-speed line of sight communication system are available, and receiving the sequence of time-based position data and transmitting the sequence of time-based position data via the at least one of the currently available non-line of sight communication system and the high-speed line of sight communication system.

2 Claims, 19 Drawing Sheets